US00RE45098E

(19) United States
(12) Reissued Patent
Ebisawa

(10) Patent Number: US RE45,098 E
(45) Date of Reissued Patent: Aug. 26, 2014

(54) ENCRYPTED START SIGNAL FOR GAME WITH DATA SUBSTITUTION IN ORIGINAL DATA AND MEANS FOR LIMITING EXECUTION

(75) Inventor: Kan Ebisawa, Kanagawa (JP)

(73) Assignee: Sony Corporation, Tokyo (JP)

(21) Appl. No.: 11/508,724

(22) Filed: Aug. 23, 2006

Related U.S. Patent Documents

Reissue of:
(64) Patent No.: 6,782,533
Issued: Aug. 24, 2004
Appl. No.: 09/829,121
Filed: Apr. 9, 2001

U.S. Applications:
(60) Division of application No. 09/125,770, filed on Aug. 24, 1998, now Pat. No. 6,539,544, which is a continuation of application No. PCT/JP97/04847, filed on Dec. 25, 1997.

(51) Int. Cl.
*G06F 9/45* (2006.01)

(52) U.S. Cl.
USPC ..... 717/171

(58) Field of Classification Search
USPC ..... 717/171, 174
See application file for complete search history.

(56) References Cited

U.S. PATENT DOCUMENTS 4,467,412 A 8/1984 Hoff
4,592,546 A * 6/1986 Fascenda et al. ..... 463/29
4,998,199 A * 3/1991 Tashiro et al. ..... 463/29
5,231,568 A 7/1993 Cohen et al.
5,292,125 A * 3/1994 Hochstein et al. ..... 463/41
5,388,211 A 2/1995 Hornbuckle
5,397,133 A * 3/1995 Penzias ..... 463/22
5,497,479 A 3/1996 Hornbuckle (Continued)

FOREIGN PATENT DOCUMENTS

JP 1-220925 9/1989
JP 5 122690 5/1993

(Continued)

OTHER PUBLICATIONS

Toshimi Kin et al., "Service Island: Proposal of virtual space supporting daily life", the Information Processing Society of Japan memoir, Jul. 8, 1994, vol. 94, 58, p. 9-16.

(Continued)

*Primary Examiner* — John Chavis
(74) *Attorney, Agent, or Firm* — Frommer Lawrence & Haug LLP; William S. Frommer

(57) ABSTRACT

This game machine system includes a set top box 51 as a receiving unit for receiving digital data distributed using a broadcast system or a communication system. In a game dedicated device 52, starting of a game software item is inhibited until a software start enable signal is received by the receiving unit. Next to the software start enable signal, data for substitution or insertion for data of part of the game software is sent. This data can be commercial ads. The game dedicated machine 52 can judge whether or not the commercial ads have been introduced into and are in operation in the game software and, if the commercial ads are not in the game software, the game dedicated machine 52 can be made so as to be out of operation.

6 Claims, 30 Drawing Sheets

(56) References Cited

U.S. PATENT DOCUMENTS

| | | | | |
|---|---|---|---|---|
| 5,682,171 | A | 10/1997 | Yokoi | |
| 5,687,307 | A | 11/1997 | Akisada et al. | |
| 5,797,795 | A * | 8/1998 | Takemoto et al. | 463/42 |
| 5,876,286 | A * | 3/1999 | Lee | 463/31 |
| 6,539,544 | B2 | 3/2003 | Ebisawa | |
| 6,611,957 | B2 | 8/2003 | Ebisawa | |
| 6,640,335 | B2 | 10/2003 | Ebisawa | |
| 6,640,336 | B1 | 10/2003 | Ebisawa | |
| 2002/0028707 | A1 * | 3/2002 | Pascal et al. | 463/42 |

FOREIGN PATENT DOCUMENTS

| | | |
|---|---|---|
| JP | 6-335569 | 12/1994 |
| JP | 7 36559 | 2/1995 |
| JP | 7 66785 | 3/1995 |
| JP | 7 135491 | 5/1995 |
| JP | 07-504336 | 5/1995 |
| JP | 7 143080 | 6/1995 |
| JP | 7 155438 | 6/1995 |
| JP | 8 63416 | 3/1996 |
| JP | 8 87489 | 4/1996 |
| JP | 8-117445 | 5/1996 |
| JP | 8-173634 | 7/1996 |
| JP | 8 206357 | 8/1996 |
| JP | 8-280934 | 10/1996 |
| JP | 8-289034 | 10/1996 |

OTHER PUBLICATIONS

"Topics on advertisement in a game", Daily publication industry newspaper, Jul. 4, 1996, p. 9.

"Tower vision", Sega Saturn perfect victory approach special, High-rise building simulation game "The tower", Keibunsha Co., Ltd., Apr. 5, 1996, First edition, p. 56-57.

* cited by examiner

| | | |
|---|---|---|
| FIG.17A | DATE AND TIME OF DELIVERY | 1996 2. 19 18:05:38 |
| FIG.17B | SYMBOLIZE | 9 6 0 2 1 9 1 8 0 5 3 8 |
| FIG.17C | RE-ARRAY | 8 3 5 0 8 1 9 1 2 0 6 9 |
| FIG.17D | LEADING-END NUMBER | 8 3 5 0 8 1 9 1 2 0 6 9 |
| FIG.17E | INSERTION | 8 3 5 0 8 1 9 1 O K 2 0 6 9 |
| FIG.17F | CODE | 38h 33h 35h 30h 38h 31h 39h 31h 6dh 6bh 32h 30h 36h 39h |
| FIG.17G | DUMMY DATA | s t a r t o k s t a r t o k |
| FIG.17H | CODE | 73h 74h 61h 72h 74h 6dh 6bh 73h 74h 61h 72h 74h 6dh 6bh |
| | | + ADD |
| FIG.17 I | ADDED CODE | abh a7h 96h a2h ach 9eh a4h a4h e1h cch a5h a4h a3h a4h |
| FIG.17J | HEADER APPENDAGE | o3h f7h abh a7h 96h a2h ach 9eh a4h a4h e1h cch a5h a4h a3h a4h |

| | | |
|---|---|---|
| FIG.18A | HEADER EXTRACTION | o3h f7h abh a7h 96h a2h ach 9eh a4h a4h e1h cch a5h a4h a3h a4h |
| FIG.18B | HEADER DELETION | abh a7h 96h a2h ach 9eh a4h a4h e1h cch a5h a4h a3h a4h |
| FIG.18C | DUMMY DATA | s t a r t o k s t a r t o k |
| FIG.18D | CODING | 73h 74h 61h 72h 74h 6dh 6bh 73h 74h 61h 72h 74h 6dh 6bh |
| | | − SUBTRACT |
| FIG.18E | SUBTRACTED CODE | 38h 33h 35h 30h 38h 31h 39h 31h 6dh 6bh 32h 30h 36h 39h |
| FIG.18F | CODING | 8 3 5 0 8 1 9 1 O K 2 0 6 9 |
| FIG.18G | EXTRACTION OF LEADING-END NUMBER | 8 3 5 0 8 1 9 1 O K 2 0 6 9 |
| FIG.18H | EXTRACTION OF INSERTED CODE | 8 3 5 0 8 1 9 1 O K 2 0 6 9 |
| FIG.18 I | SEPARATION OF INSERTED CODE | 8 3 5 0 8 1 9 1 2 0 6 9 INSERTED CODE 160 ok |
| FIG.18J | RE-ARRAY | 9 6 0 2 1 9 1 8 0 5 3 8 |
| FIG.18K | DATE AND TIME OF DELIVERY | 1996 2. 19 18:05:38 |

ENCRYPTED START SIGNAL FOR GAME WITH DATA SUBSTITUTION IN ORIGINAL DATA AND MEANS FOR LIMITING EXECUTION

Matter enclosed in heavy brackets [ ] appears in the original patent but forms no part of this reissue specification; matter printed in italics indicates the additions made by reissue.

This is a Divisional of application Ser. No. 09/125,770 filed Aug. 24, 1998 now pending, which is a continuation of copending International Application PCT/JP97/04847 having an international filing date of Dec. 25, 1997.

TECHNICAL FIELD

This invention relates to a game machine system, capable of displaying commercial advertisements, a data distribution system and method for distributing data, a program executing method and apparatus for executing the software and a program starting controlling method and apparatus.

BACKGROUND ART

This invention has a technical pertinence to the Japanese patent Application No.7-166,682 of the same inventor filed in the name of the assignee of the present invention on Jun. 30, 1995, entitled 'Game Machine System and Game Method Capable of Commercial Advertisements'.

Recently, game machines have been propagated not only in the dedicated game corner shops, but also in homes, such that the racing game software of a vehicle or the aircraft flight simulator game software is marketed in large quantities.

In the game machine, if a game software item, such as a racing game software item, is started, the landscape faithfully representing a real F1 racing field is represented on a display. Each racing car is run on a circuit course at an elevated speed in accordance with commands entered by an operator via an operating board, such as a joystick.

Although commercial ads are presented in the real F1 racing field on a walling of a background circuit course, placards, advertising towers or on a chassis of the vehicle, there lacks an instance of positively incorporating the corresponding commercial ads in the game software.

The ads built on the game are limited to advertisements of the software producing firms before or after the game of the game software or on scene change, while there lacks an instance in which positive commercial ads are made in particular scenes in the game software.

Even if ads are sometimes displayed in the background, these are formal ads for faithfully simulating the real landscape of the circuit course, while there are no instances of commercial ads taking profitability into account.

The current civil TV broadcasting firms are managed by profits from the commercial ads, instead of broadcasting fees being charged to the receivers.

In similar manner, if commercial ads can be built into the walling of the background circuit course, placards or advertising towers of the game software, for meeting the demands of a third firm, the advertisement fees can be charged to the advertising firm so that the sale price of the game software can be lowered or reduced to zero.

Moreover, since a particular game software is thought to be used a number of times, if the contents of the ads can be optionally modified or updated, these will prove to be effective commercial ads to lead to expected advertisement income. This accounts for the motive which has led to the present invention.

The Japanese patent application No.7-166,682 discloses an invention in which it is proposed to introduce commercial ads during the game.

The insertion of the commercial ads leads to cost reduction and hence to increased sale volume of the game software.

However, there lacks a suitable method whereby it can be judged whether or not the commercial ads are introduced and in operation so that, if there are introduced no commercial ads, the operation of the software will cease.

If the commercial ads are introduced and in operation, the sponsors of the commercial ads have to bear and pay the charges. Therefore, it is necessary to inhibit the operation of the software without making the commercial ads. This, however, has not been taken into account sufficiently in the invention pertaining to the Japanese Patent application No.7-166,682.

When a game software is first presented for sale, many users use the software. However, as time elapses since the start of sale, the number of the users is decreased.

If the number of the users is decreased, the utility of the game software as the commercial ads is decreased. In a game machine which cannot be run unless the updated commercial ads are introduced, it is necessary to distribute the updated software data although the commercial ads are lowered in utility, thus raising the cost of the software.

DISCLOSURE OF THE INVENTION

It is therefore an object of the present invention to provide a game machine system in which home game machines are connected via a communication network to a host computer (controller) to provide a game machine system and in which the game software items used in the game machine system is designed so that the commercial ads can be built into the game software responsive to the demands of the advertising firms. It is also an object of the present invention to provide a game method utilizing the game machine system, a data distribution system, a program executing method and apparatus and a program start controlling method and apparatus, exploiting this game machine system.

It is another object of the present invention to provide a game machine system in which commercial ads utilized in the game machine system cam be suitably easily updated, and a game method utilizing the game machine system, a data distribution system, a program executing method and apparatus and a program start controlling method and apparatus, exploiting this game machine system.

It is a further object of the present invention to provide a suitable method for judging whether or not commercial ads are introduced and in operation in a game software item and for taking measures so that the game software will not be in operation if the result of judgment is negative.

It is a further object of the present invention to provide a system for starting a game of a game software put on sale some time before and the sale volume of which is decreased, even failing the newly updated commercial ads, and a data distribution system, a program executing method and apparatus and a program start controlling method and apparatus, exploiting this game machine system.

A broadcast system according to the present invention is such a system capable of distributing digital data, in which, in a receiving side system, software start enable signals are repeatedly sent to a receiving side system at an interval and in which an identification signal for the software and data for substitution or insertion for a portion of the data during operation of the software are distributed in an interval between the software start enable signals. In this case, the data for substitution or insertion may be commercial ads.

The game can only be started when the software start enable signal is sent to the receiving side. By containing the time information in the software start enable signal, the information can be varied randomly.

A transmitting side system distributing the digital data by exploiting the broadcast system, according to the present invention, is such a system in which a software start enable signal, an identification signal for a software started in the receiving side system and data for substitution or insertion for a portion of the data during operation of the software are stored in a storage device, the software start enable signal is sent to the receiving side system and the software identification signal and the data for substitution or insertion are sent in an interval between the software start enable signals. In this case, the data for substitution or insertion may be commercial ads.

The game can only be started when the software start enable signal is sent to the receiving side. By containing the time information in the software start enable signal, the information can be varied randomly.

A receiving side system for receiving digital data distributed by exploiting a broadcast system, according to the present invention, is such a system which includes receiver means for receiving the digital data and a game machine connected to the receiver means and capable of running the software. The game software is prohibited from starting in the game machine until the software start enable signal is received by the receiver means. In this case, the data for substitution or insertion may be commercial ads.

The game can only be started when the software start enable signal is sent to the receiving side. By containing the time information in the software start enable signal, the information can be varied randomly.

An optical disc used in a receiving side system adapted for receiving data distributed by exploiting the broadcast system or the communication system, according to the present invention, is such an optical disc in which a software identification signal is appended to a recorded software item and the receiving side system can selectively use the distributed data.

A communication system for receiving/transmitting digital data, according to the present invention, is such a communication system in which, if an identification signal for a software to be started is received from a receiving side system, a software start enable signal is sent, at the same time as data for substitution or insertion for a portion of the data during operation of the software are distributed. In this case, the data for substitution or insertion may be commercial ads.

The game can only be started when the software start enable signal is sent to the receiving side. By containing the time information in the software start enable signal, the information can be varied randomly.

A transmitting side system capable of receiving and transmitting digital data by exploiting the communication system, according to the present invention, is such a system in which a software start enable signal, a signal capable of identifying a software started on a receiving side system and data for substitution or insertion for a portion of the data during operation of the software are stored in a storage device, and in which, if the signal capable of identifying the started software is received from the transmitting side system, a software start enable signal is sent to the transmitting side system and data for substitution or insertion for a portion of the data during operation of the software are distributed. In this case, the data for substitution or insertion may be commercial ads.

The game can only be started when the software start enable signal is sent to the receiving side. By containing the time information in the software start enable signal, the information can be varied randomly.

A receiving side system capable of receiving and transmitting digital data by exploiting the communication system, according to the present invention, includes communication function means and a game machine capable of operating a software item. The game machine transmits, on starting the software, an identification signal for the software adapted for starting, to a transmitting side system, the starting of the software being inhibited until acceptance of the software start enable signal sent next. In this case, the data for substitution or insertion may be commercial ads.

The game can only be started when the software start enable signal is sent to the receiving side. By containing the time information in the software start enable signal, the information can be varied randomly.

A data distribution system for distributing data to a plurality of receiving devices, according to the present invention, includes means for recognizing a software program started on a receiving side device on reception of the supplied program identification information, means for generating program start enable signal, which is a signal in meeting with a software program recognized by the recognition means and which, if the software program is a regular software program, enables starting of the regular software program, and means for distributing the program start enable signal and for distributing data for substitution or insertion of part of the software program started in accordance with the program start enable signal.

A program executing apparatus for executing a software program, according to the present invention, includes reception means for receiving program start enable signal distributed from a data distributing device and data for substitution or insertion for original data of the software program and control means for substituting or inserting the original data of the software program for the data responsive to the program start enable signal received by the reception means for executing the software program.

A program start control apparatus for controlling the starting of a software program according to the present invention includes receiving means for receiving from a data distributing device data for substitution or insertion for original data of part of the software program and an encrypted program start enable signal and limiting means for enabling execution of a program of substituting or inserting the data for original data of part of the software program if the encrypted program start enable signal can be decoded regularly. The limiting means limits starting of the software program if the encrypted program start enable signal cannot be decoded regularly.

BRIEF DESCRIPTION OF THE DRAWINGS

FIG. 17 shows an example of encoding of PSE signals embodying the present invention.

FIG. 18 shows an instance of decoding of the PSE signals embodying the present invention.

BEST MODE FOR CARRYING OUT THE INVENTION

Figure 1:
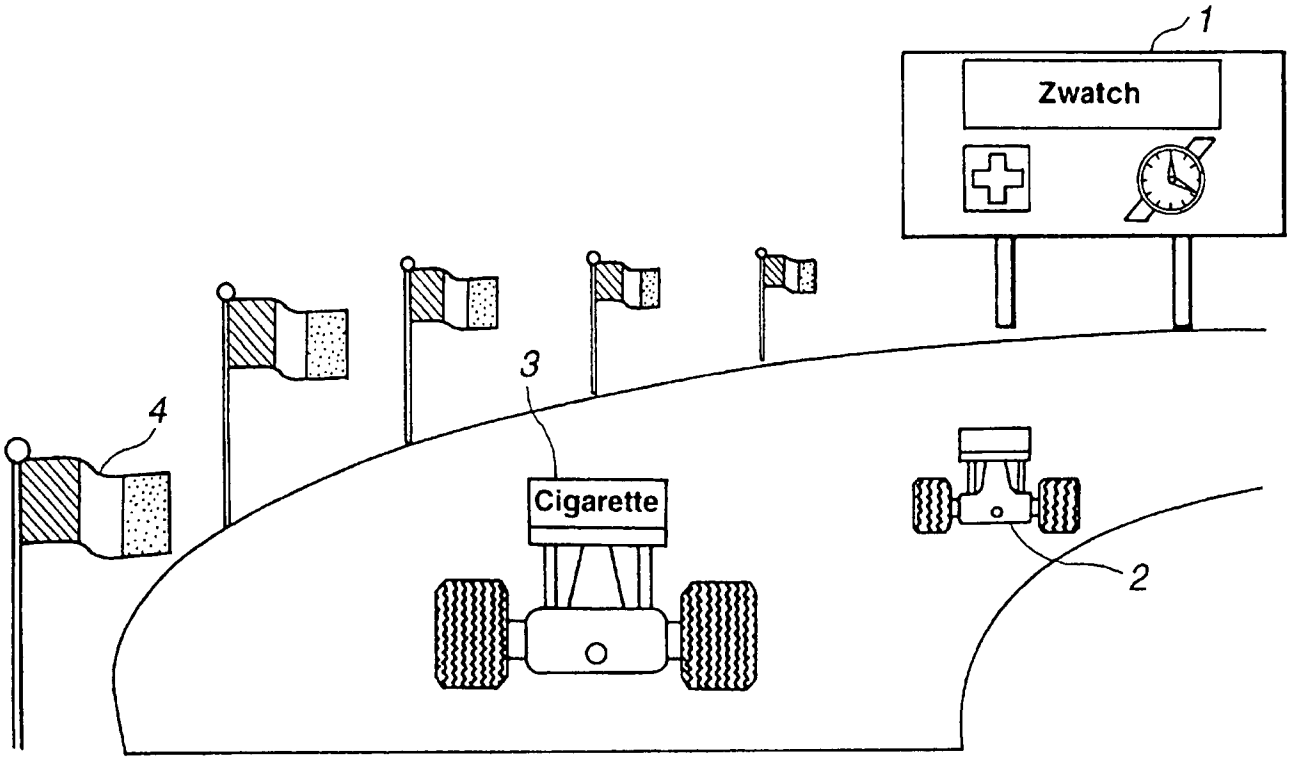
FIG. 1 shows a scene in a racing game in an embodiment of the present invention.

Referring to the drawings, preferred embodiments of the present invention will be explained in detail.

The embodiments of the present invention are meant to encompass a game machine system, a communication system and a broadcast system in which a code for limiting the starting of a game program is sent from a CM data server on starting a game software item such as to inhibit starting of the game in the absence of a CM inserted therein.

Figure 2:
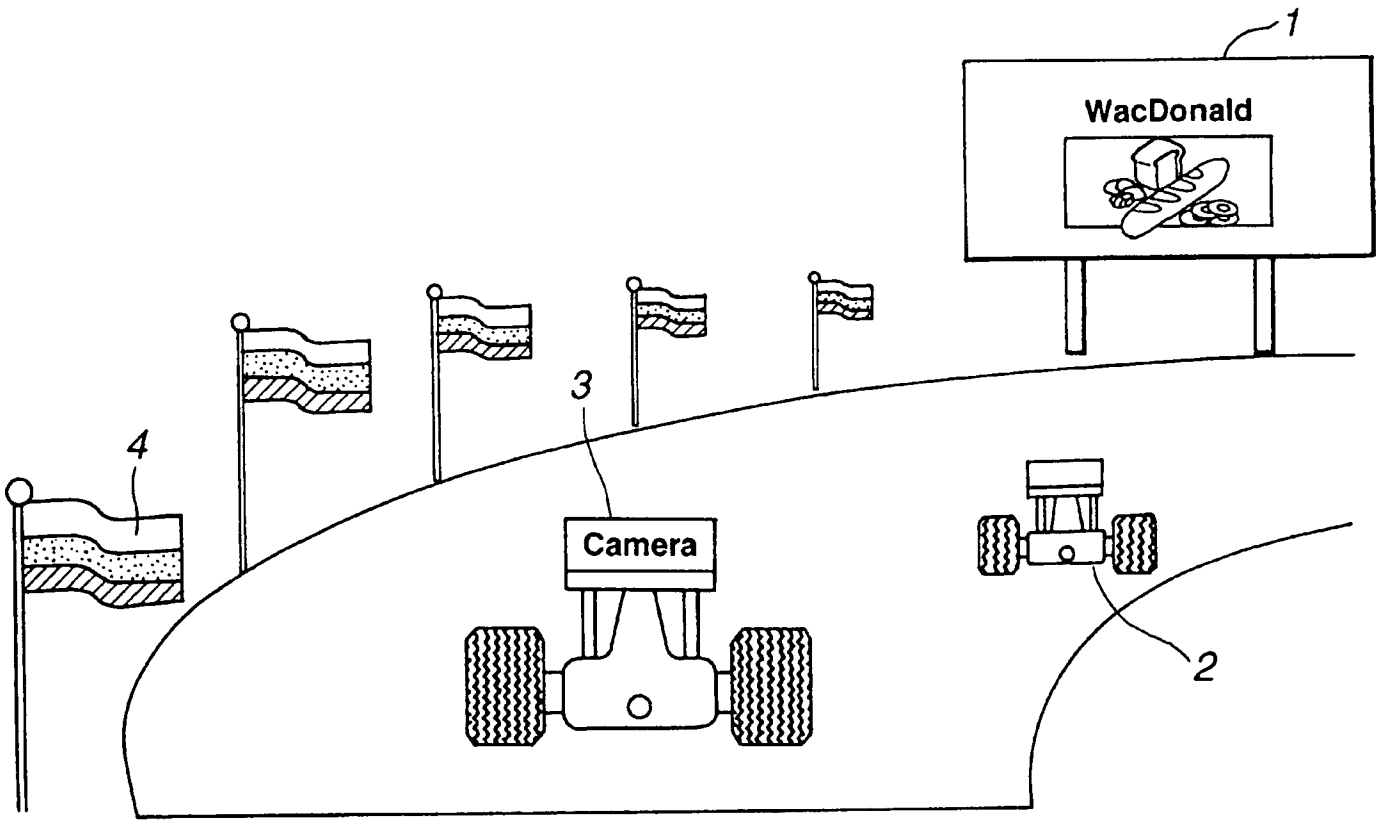
FIG. 2 shows a scene in a racing game in an embodiment of the present invention.

FIGS. 1 and 2 illustrate a scene in a game.

FIG. 1 shows a scene when a software supplied as a CD-ROM (game program) is directly started, in which CM data 1 and 3 are original old data while a car 2 and a flag 4 are also original old data.

FIG. 2 is a scene when a CM data portion or another data portion is replaced by new data (updated data) by the broadcast or communication system.

In the software supplied by the CD-ROM, a placard 1 is an advertisement of a timepiece, as shown in FIG. 1. In FIG. 2, it is an advertisement for hamburger. Similarly, a car 2 is different in color, while a car 3 is not only different in color but is an advertisement for a camera instead of for a cigarette in FIG. 1. A flag 4 is a tri-color flag divided in the transverse direction and a tri-color flag divided in the longitudinal direction. That is, by exchanging data of part of the game software, different advertisements can be inserted even in the same game.

These commercial advertisements and scenes of games, such as cars or flags, that can be updated, are termed "CM data or the like" in the present specification and drawings.

Transmission Side System and Reception Side System

FIGS. 3 to 7 are block diagrams of a system for executing a game software item capable of updating mainly the CM data or the like.

Referring to the following table 1, the schematics of the system now explained will be comprehensively clarified.

TABLE 1

Figure 3:
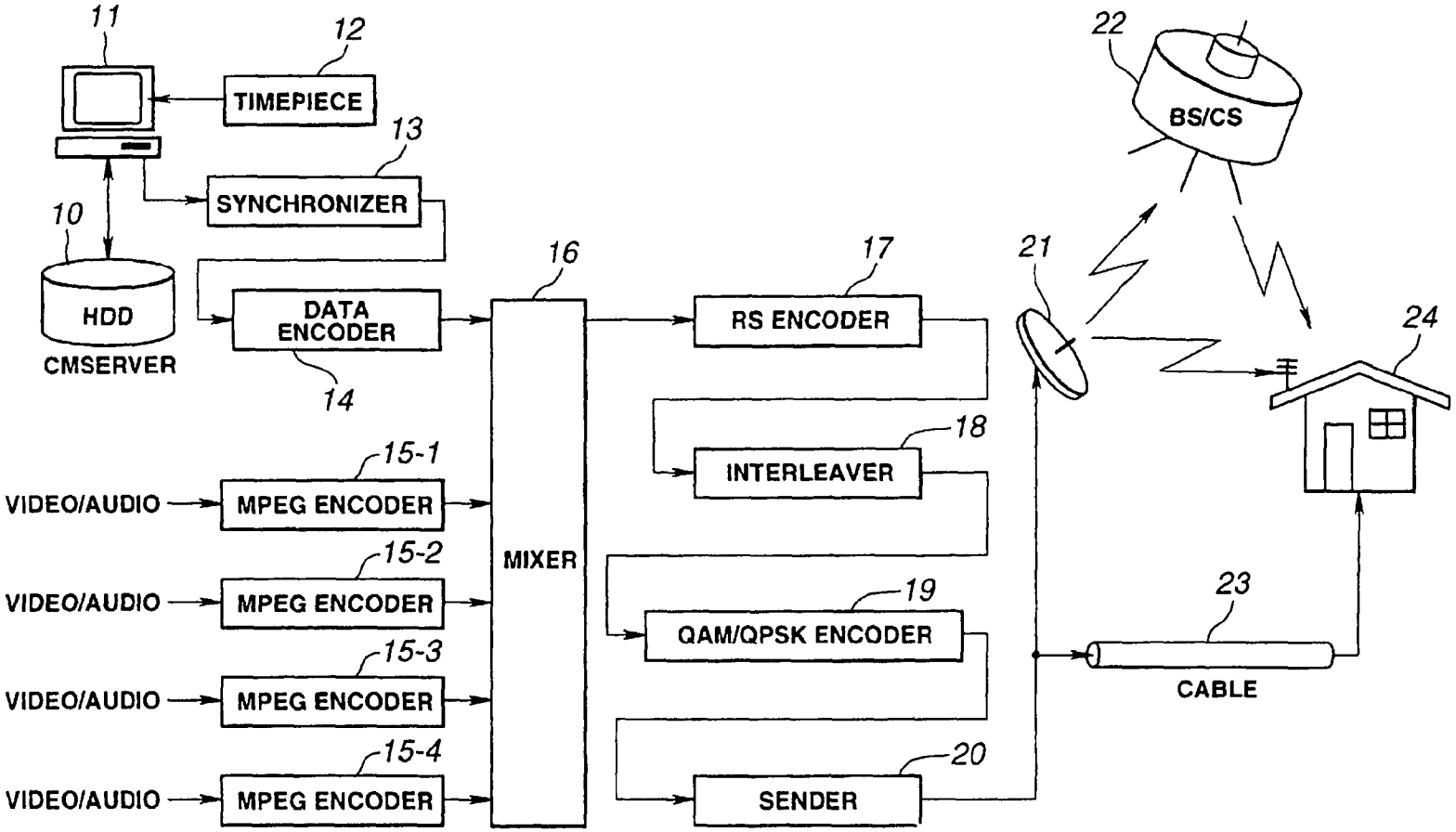
FIG. 3 shows a transmitting side system for supplying CM data exploiting a broadcasting system in an embodiment of the present invention.
Figure 4:
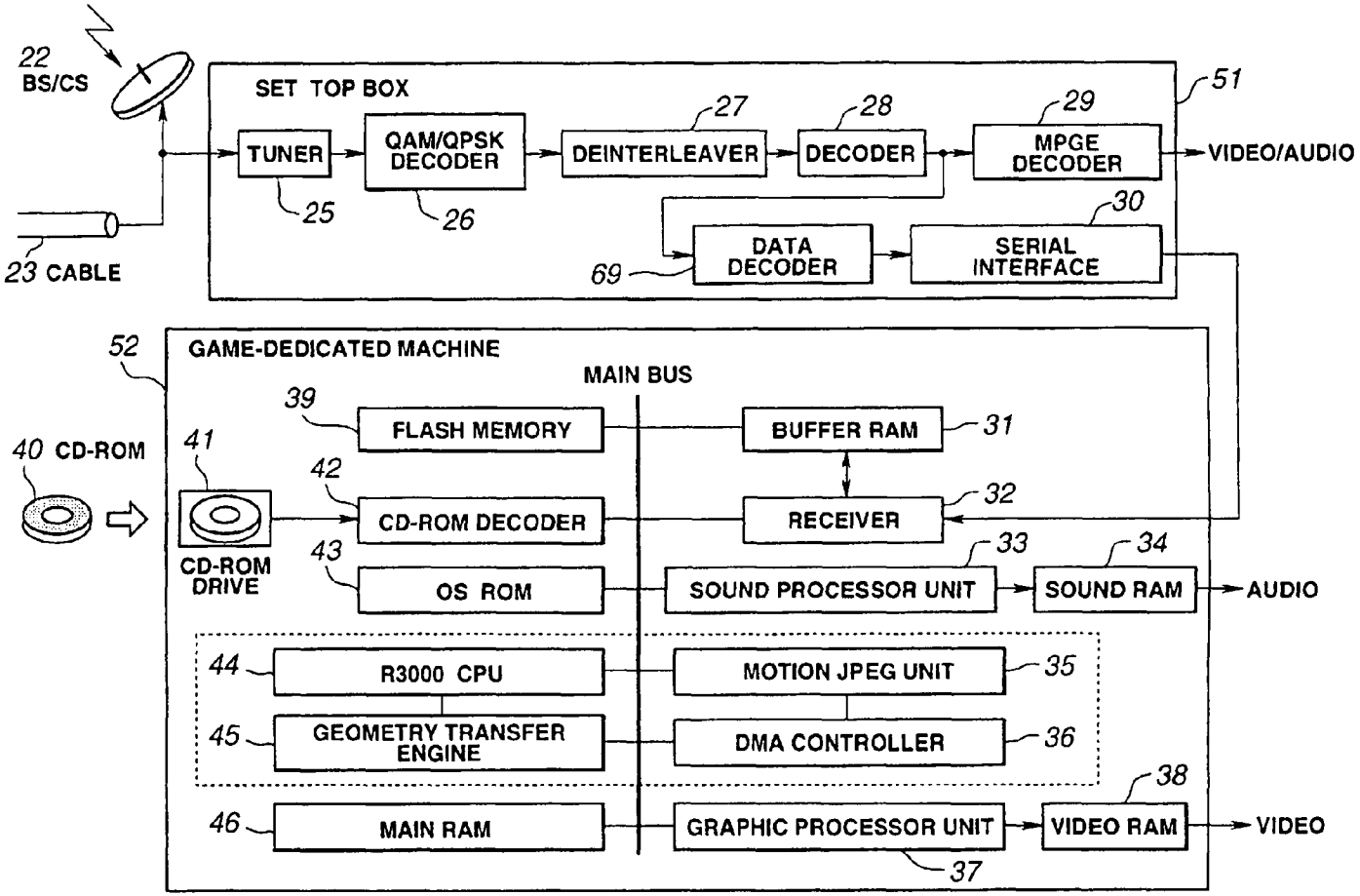
FIG. 4 shows a game dedicated machine of an embodiment of a reception side system in an embodiment of the present invention.
Figure 5:
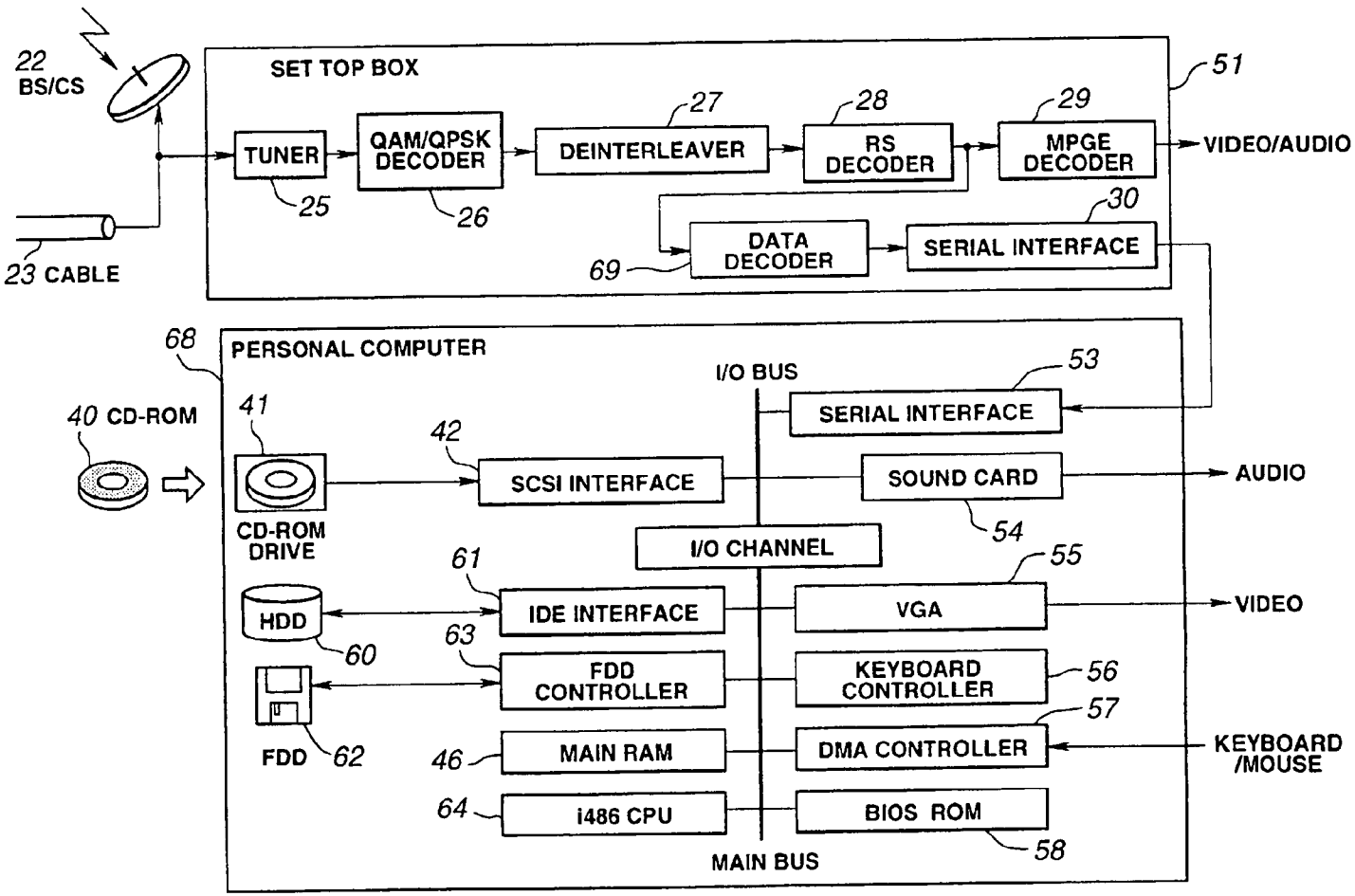
FIG. 5 shows a system employing a personal computer of an embodiment of the receiving side system embodying the present invention.
Figure 6:
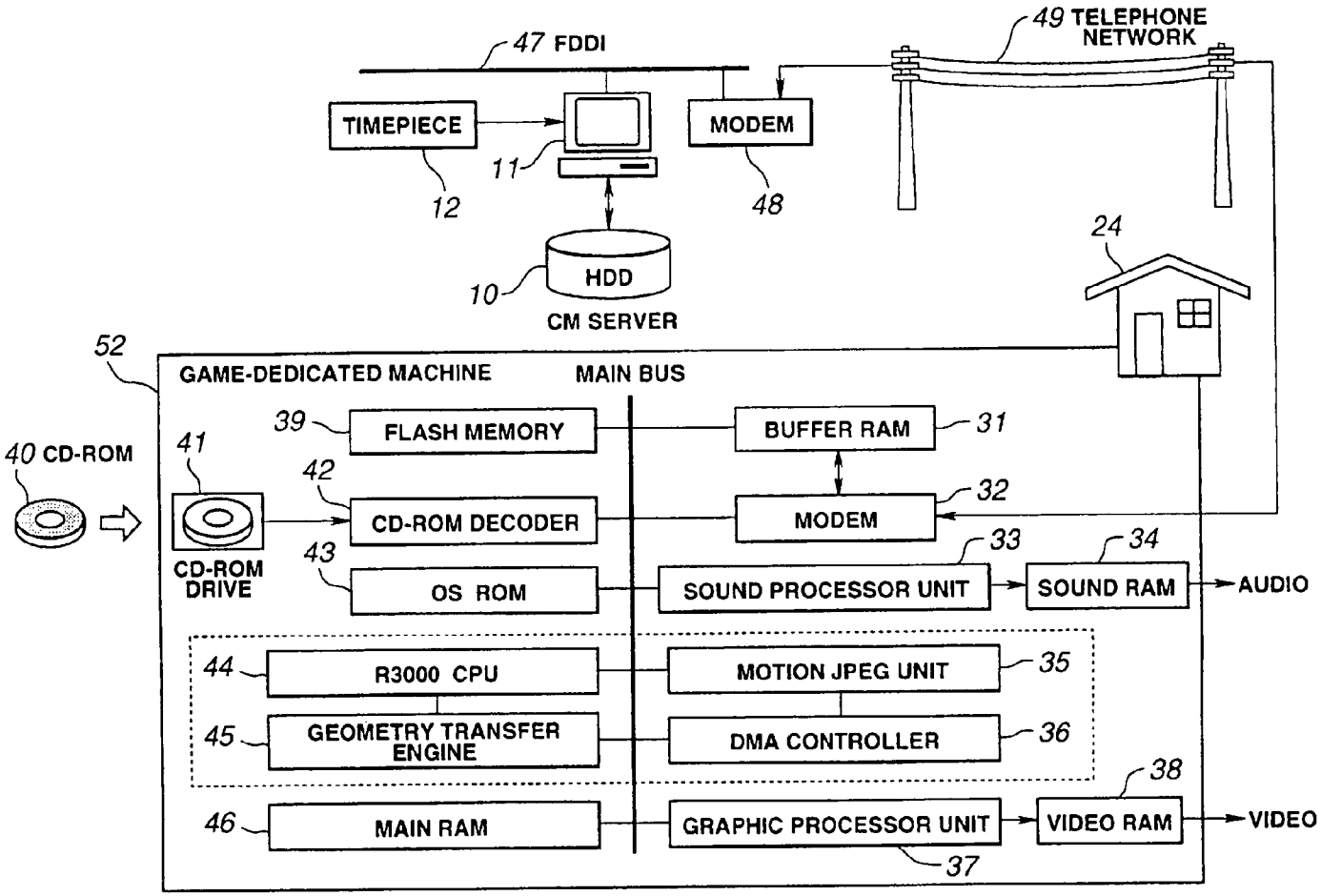
FIG. 6 shows an example of a receiving side system embodying the present invention.
Figure 7:
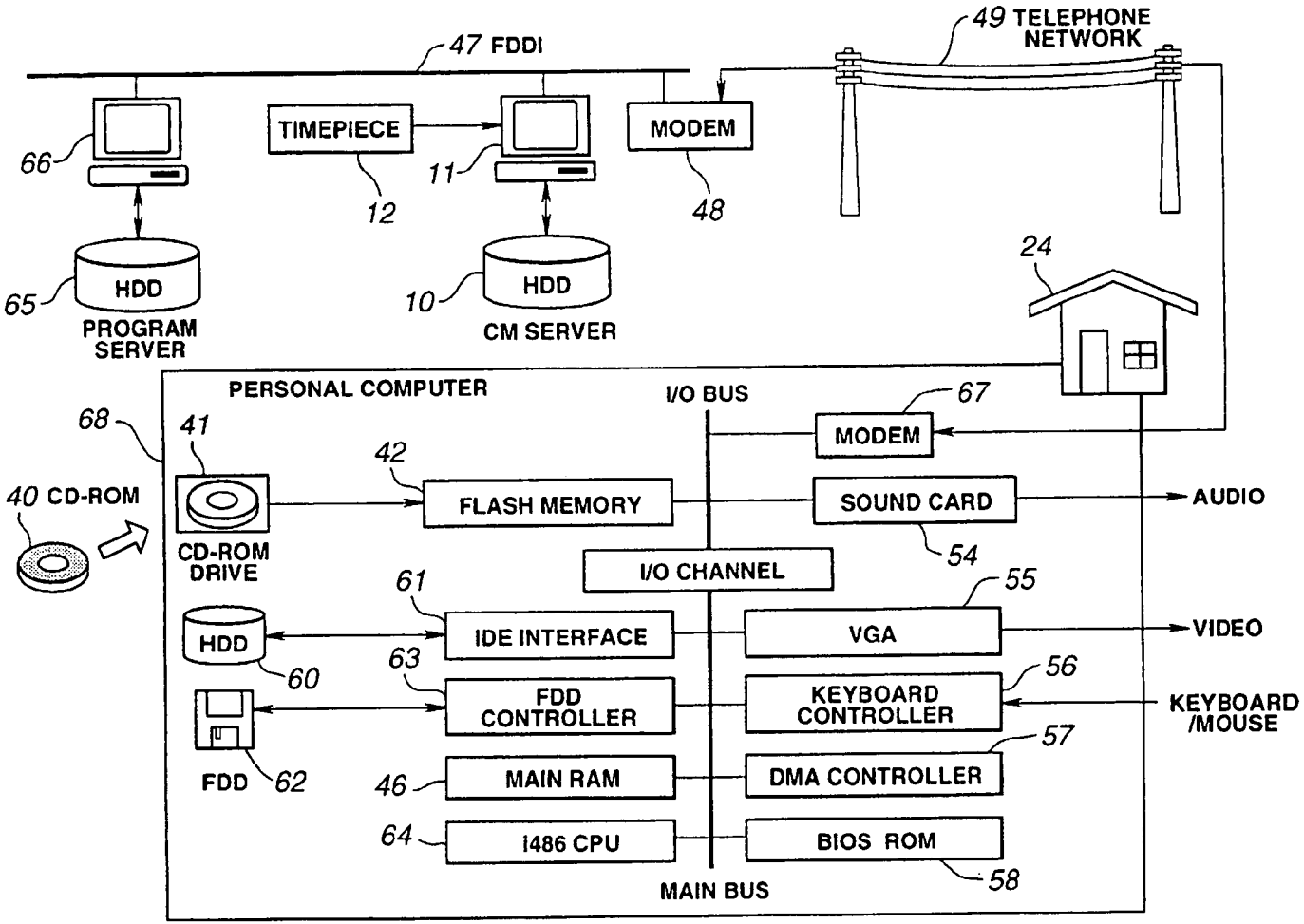
FIG. 7 shows an embodiment of a transmitting side system and a receiving side system embodying the present invention.

| | sending side system | receiving side system: equipment used | game program (including old CM data or the like) | supply of new CM data | drawings |
|---|---|---|---|---|---|
| using broadcast system | FIG. 3 | game dedicated machine | CD-ROM | CM server→ broadcast system→ buffer RAM of game machine | FIG. 4 |
| | | PC | | CM server→ broadcast system→ HDD of PC | FIG. 5 |
| using communication system | upper part of FIG. 6 | game dedicated machine | | CM server→ broadcast system→ buffer RAM of game machine | FIG. 6 |
| | upper part of FIG. 7 | PC | download from program server | CM server→ communication system HDD of PC | FIG. 7 |

First, there is a difference as to whether the system used in updating the CM data is a broadcast system or the communication system.

As the transmission side system supplying updated new CM data, the broadcasting system is shown in FIG. 3 and the communication system is shown in an upper part of FIG. 6 and an upper part of FIG. 7. The difference between FIGS. 6 and 7 is that the former transmits only the new CM data, while the latter furnishes, in addition to the CM data or the like, the game software (game program) itself by so-called downloading.

Turning to the receiving side system, a game dedicated machine and a personal computer (so-called 'PC') can be used as the equipment used on the receiving side system in both the case of using the broadcasting system and the communicating system. In the present specification, the term 'game machine' means both the game dedicated machine and the personal computer.

FIGS. 4 and 7 show the difference in the supplying route of the new CM data or the like.

First, if the broadcasting system is used, and the game dedicated machine is used as the equipment used on the receiving side, the game program (including old CM data or the like) is sent by the CD-ROM purchased by the user. The new CM data or the like is then sent via this broadcasting system to the buffer RAM of the game dedicated machine. The corresponding system is now explained in detail by referring to FIG. 4.

Next, if the broadcast system is used, and a personal computer is used as the equipment used on the receiving side, the game program containing the old CM data is similarly supplied by the CD-ROM. The new CM data or the like is then supplied via this broadcast system to a HDD (hard disc drive) of the personal computer. The corresponding system is explained in detail with reference to FIG. 5.

Next, if the communication system is used, and a game dedicated machine is used as the equipment used on the receiving side, the game program containing the old CM data is similarly supplied by the CD-ROM. The new CM data or the like is then supplied via this communication system to a buffer RAM of the game dedicated machine.

The corresponding system is explained in detail with reference to FIG. 6.

Next, if the communication system is used, and a personal computer is used as the equipment used on the receiving side, the game program containing the old CM data is similarly supplied by the CD-ROM. The new CM data or the like is then supplied via this communication system to a HDD of the personal computer. The corresponding system is explained in detail with reference to FIG. 7.

In FIG. 7, the game program itself, containing the old CM data or the like, is furnished by downloading from the transmitting side computer system via communication system to the HDD of the personal computer, and subsequently the new CM data or the like is furnished via this communication system to the HDD of the personal computer. The corresponding system is also explained in detail with reference to FIG. 7.

The respective systems are hereinafter explained.

Transmitting Side System

Transmitting Side System Employing the Broadcast System

FIG. 3 shows a block diagram of a transmitting side broadcast system in case the broadcast system is used for transmitting the CM data or the like suitably updated with lapse of time. The new CM data or the like is herein sent to the receiving side system of each home using one channel of a digital multi-channel broadcast.

This broadcast system includes a hard disc drive (HDD) 10, a control computer 11, a timepiece 12, a synchronizer 13, a data encoder 14, a mixer 16, a RS encoder 17, an interleaver 18, a QAM/QPSK encoder 19 and a transmitter 20. The broadcast system also includes an antenna 21, a (broadcast or communication) satellite 22 or a cable 23, depending on the type of the broadcast system.

The CM data or the like is stored in the HDD 10 as a CM server. The control computer 11 reads from the HDD 11 the program start enable signal (PSE signal) as later explained, a program ID (identification), CM data and other data (CM data or the like), at a pre-set time interval, in association with the reference timepiece 12, and transfers the read-out data to the synchronizer 13. The transferred CM data or the like is converted by the synchronizer 13 into a time synchronization signal which is then encoded by the data encoder 14 and thence supplied to the mixer 16.

The supplied CM data or the like is multiplexed by the mixer 16 with video and audio signals for other channels encoded with high efficiency encoding by a MPEG encoder 15. The multiplexed signals are encoded with Reed-Solomon codes by the RS encoder 17 and interleaved by the interleaver 18 so as to be then modulated for broadcasting by the QAM/QPSK encoder 19.

If the broadcasting satellite (BS) is used, the modulated signals are modulated with QPSK modulation (four-phase phase shifting and modulation). If the communication satellite (CS) or the cable (CATV) is used, the modulated signals are modulated with QAM (quadrature amplitude modulation).

In the case of the satellite broadcasting, the modulated signals are then sent via antenna 21 and satellite (BS/CS) 22 to the receiving side (game dedicated machine or the personal computer) of a home 24. In case of the CATV, the modulated signals are sent via CATV cable 23 to the receiving system of the home 24. Thus, the receiving side system employing the broadcast system is the unidirectional communication of supplying only the CM data or the like.

Transmitting Side System Exploiting the Communication System

The upper part of FIG. 6 and an upper part of FIG. 7 show block diagrams of the transmitting side system in case of using the communication system for transmitting the CM data or the like suitably updated with lapse of time. Since this transmitting side system has data exchange with the receiving side system, it will be explained in conjunction with the explanation of the receiving side system with reference to FIGS. 6 and 7.

Receiving Side System

The receiving side system is hereinafter explained.

Receiving Side Game Dedicated System Exploiting the Broadcast System

FIG. 4 shows such a receiving side system in which, if the broadcast system is used, ands the game dedicated machine is utilized as the game machine of the receiving side system, the game program (including the old CM data or the like) is supplied by the CD-ROM purchased by the user and subsequently the new CM data or the like is supplied via this broadcast system to the buffer RAM of the game dedicated machine.

If the broadcast system is used, data is supplied unidirectionally, that is in a direction from the broadcast system to the receiving side system.

This receiving side system includes a set top box 51, as receiving means for receiving signals sent via satellite 22 or over cable 23 (such as new CM data), and a game dedicated machine 52. The set top box 51 include a tuner 25, a QAM/QPSK decoder 26, a deinterleaver 27, a RS decoder 28, a MPEG decoder 29, a data decoder 69 and a serial interface 30.

The game dedicated machine 52 of FIG. 4 may, for example, be 'Playstation' manufactured by SONY COMPUTER ENTERTAINMENT INC. This game dedicated machine 52 includes a buffer RAM 31, a receiver 32, a sound processor unit 33, a sound RAM 34, a motion JPEG decider 35, a DMA controller 36, a graphic processor unit 37, a video RAM 38, a flash memory 39, a CD-ROM 40, a CD-ROM drive 41, a CD-ROM decoder 42, an OS ROM 43, a CPU 44, such as R3000 series, a geometric transfer engine 45, a main RAM 46 and a main bus.

The signals sent over the satellite 22 or cable 23, such as new CM data, are selected by the tuner 25 in the set top box 51, so as to be then QPSK demodulated or QAM demodulated by the QAM/QPSK decoder 26 in a reversed manner from the case of the processing during modulation. The demodulated signals are then deinterleaved by a deinterleaver 27 and demodulated for the Reed-Solomon code by the RS decoder 28. The resulting video and audio signals of the usual broadcast program, independent of the game software, are demodulated by the MPEG decoder 29 for restoration to the video and audio signals.

The new CM data or the like for the game dedicated machine, are passed through a data decoder 69, which forms a pair with the transmitting side data encoder 14 of FIG. 3, so as to be supplied via serial interface 30 to the game dedicated machine 52. The data received by the receiver 32 of the game dedicated machine 52 is stored in the buffer RAM 31 adapted for absorbing the difference in the transfer rate inside and outside the game dedicated machine.

When the CD-ROM disc 40, having recorded therein the game program (including old CM data or the like), is loaded on the CD-ROM drive 41 of the game dedicated machine 52, the game program is transferred via the CD-ROM decoder 42 to the main RAM 46 for storage.

During this transfer, the new CM data or the like already in the buffer RAM 31 may be assembled in the main program, or a sub-routine call may be assembled in the main program after transfer for calling out the new CM data or the like in the buffer RAM 31, as will be explained subsequently in detail. In any case, the CPU 44 causes the game to proceed based on the data in the main RAM 46.

The function of the remaining portions of the game dedicated machine 52 will be explained briefly. The OS of the game dedicated machine is stored in the OS ROM 43 and a DMA (direct memory access) controller 36 controls data transfer via the main bus. The flash memory 39, holding on memory the time data in the PSE signal, as will be explained substantially, is used for starting the next game. The geometric transfer engine 45 (coordinate transformation engine) effects coordinate calculations on an object, while the motion JPEG decider 35 defreezes the compressed picture data. The motion JPEG decider 35, CPU 44 and the geometric transfer engine 45, surrounded by a broken line, are constructed as a one-chip IC.

The graphic processor unit 37 for vide outputting, as an outputting system, controls the picture displayed on a monitor, not shown. The video RAM 38 performs the role of the picture feed-out buffer so that the picture is outputted by a monitor. The sound outputting sound processor unit 33 for outputting the speech controls the speech control from the speaker, while the sound RAM 34 performs the role of the feed-out buffer, as the video RAM 38, so that the speech is outputted by the speaker, not shown.

Reception Side Personal Computer System Exploiting the Broadcast System

FIG. 5 shows a receiving side system in which, when the broadcast system is similarly used and a personal computer (PC) is used as the game machine of the receiving side system, the game program containing the old CM data or the like is similarly supplied by the CD-ROM and the new CM data of the like is supplied via this broadcast system to the HDD (hard disc drive) of the personal computer.

The receiving side system shown in FIG. 5 includes the set top box 51, adapted from receiving signal sent via satellite 22 or over cable 23, and a personal computer (PC) 68. The set top box 51 is similar to that shown in FIG. 4. The personal computer 68 is a personal computer similar to the DOS/V machine and includes a CD-ROM drive 41, a serial interface 53, a sound card 54, a VGA 55, a keyboard controller 56, a DMA controller 57, a BIOS ROM 58, a SCSI interface 59, a HDD 60, an IDE interface 61, a FDD 62, a FDD controller 63, a CPU 64, an I/O bus, an I/O channel and a main bus.

On comparison with the system of FIG. 4, the receiving side system of FIG. 5 differs from the system of FIG. 4 in that a personal computer (PC) 68 is used as a game machine in place of the game dedicated machine 52. The set top box 51 is not explained specifically because it is the same as that shown in FIG. 4. The new CM data sent over the serial interface 30 of the set top box 51 is received by the serial interface 53 in the personal computer 68 and transmitted over the IO bus, I/O channel and the main bus so as to be recorded via IDE interface 61 on the HDD 60.

In the personal computer 68, similarly to the game dedicated machine 52, if the CD-ROM disc 40, having recorded thereon the game program (containing the old CM data or the like), is loaded on the drive 41, the game program is transferred via the SCSI interface 59 to the main RAM 46 for storage. During this transfer, the new CM data or the like is read out from the HDD 60 so as to be stored in other sites on the main RAM 46. A sub-routine call is then assembled in the main program on the main RAM 46 for calling out the CM data or the like in other portions of the main RAM. This method will be explained later in more detail. In any case, the CPU 44 causes the game to proceed on the basis of data in the main RAM 46.

Turning to other components of the personal computer (PC) 68, the CPU 64 is e.g., a 486 series of INTEL INC. of USA, while BIOS (Basic I/O system) ROM 58 has the computer OS loaded thereon and the DMA (direct memory access) controller 57 effects data transfer control over the main bus.

The floppy disc drive (FDD) 62 effects data read-write on or from the floppy disc via a FDD controller 63.

The keyboard controller 56 receives signals from the keyboard and the mouse. Turning to the output system, the video graphics array (VGA) 55 outputs video signals to a monitor, not shown, while the sound card 54 restores the encoded signals by e.g., MIDI (music instruments digital interface) for outputting the restored signals via a speaker.

Game Dedicated System Exploiting the Communication System

FIG. 6 shows the transmitting side system and the receiving side system when utilizing the communication system.

If the game dedicated machine is used, there is shown as a game machine on the receiving side system a receiving system in which the game program containing the old CM data or the like is supplied by the CD-ROM purchased by the user and in which the old CM data or the like is supplied via this communication system to the buffer RAM of the game dedicated machine. The case of using the communication system differs from the case of using the broadcast system in that the bi-directional communication is carried out in the former case with the transmitting side system.

The transmitting side system employing the communication system includes the HDD 10, as a server for the CM data or the like, control computer 11, timepiece 12, FDDI (fiber distributed data interface) 47, and a modem 48, and is connected to a telephone network 49.

The game dedicated machine 52 of the receiving side system is similar to that of FIG. 4 except that its receiving end is a modem 50.

In the game dedicated machine 52, if the CD-ROM disc 40 is loaded on the drive 41, the program ID signals as later explained are read and sent via modem 50, telephone network 49 and host-side modem 48 to the control computer 11.

In the control computer 11, the program start enable (PSE) signal, as later explained, the program ID signal and new CM data stored in the hard disc drive as a server of the CM data, are sent via modem 48 and telephone network 49 to a modem in the game dedicated machine 52.

The game dedicated machine 52 starts the operation by the program start enable (PSE) signal for storage of the CM data or the like in the buffer RAM 31. The operation in the game dedicated machine 52 is otherwise the same as that in the system of FIG. 4 so that the corresponding explanation is omitted for simplicity.

Receiving Side Personal Computer System Exploiting Communication System

FIG. 7 shows a receiving system in which, if the communication system is used, and the personal computer is used as a game machine of the receiving side system, the game program containing the old CM data or the like is supplied by the CD-ROM and the new CM data or the like is supplied via this communication system to the HDD of the personal computer.

FIG. 7 shows a receiving system in which the game software as such, containing the old CM data or the like, is pulled out from the transmitting side computer system via the communication system to the HDD of the personal computer and in which new CM data or the like is supplied via this communication system to the HDD of the personal computer. Although the game software as such is downloaded only once at first, the new CM data or the like is supplied each time the game software is supplied.

For downloading, the transmitting side system exploiting the communication system has the FDD 147, HDD 65 as a program server, and a program server control computer 66, in addition to the system of FIG. 6.

In this system, the personal computer 68 is used as a game machine in place of the game dedicated machine 52 of FIG. 6. This system differs from the system of FIG. 5 in that its receiving end is a modem 67. As in FIG. 6, when the CD-ROM disc 40 is loaded on the CD-ROM drive 41, the program ID signal, as later explained, is read via SCSI interface 59. This program ID signal is sent via model 67, telephone network 49 and the host side modem 48 to the control computer 11.

The control computer 11 sends the program start enable signal (PSE signal) as later explained, the program ID signal supplied thereto and the CM data stored in the HDD 10 as a CM server to the modem 67 in the game dedicated machine 52. The CM data or the like is stored in the HDD 60 as in the system of FIG. 5.

With this system, the game software is not acquired by purchasing the CD-ROM 40, but is obtained on downloading from the host computer. The downloading request from the personal computer 68 is sent via modem 67, telephone network 49, host side modem 48 and FDD 147 to the program server controlling computer 66.

The program server controlling computer 66 is responsive to the downloading request from the personal computer 68 to send the pre-set program stored in the HDD 65 as a program server via FDD 147, modem 48 and telephone network 49 to the modem 67 in the personal computer 68.

The personal computer 68 then causes the gam program to be stored in the HDD 60.

On program starting, the game program is read to the RAM 46 from the HDD 60 instead of from the CD-ROM 40. Only one game software downloading operation suffices for one game sort. That is, although downloading needs to be carried out for each different type of the game software items, the same sort of the game software, once stored, needs only to be read from the HDD 60. Conversely, the new CM data or the like, stored in the HDD 10, is read out via telephone network 49 each time the game software is started. This system is otherwise the same as the system of FIG. 5 and hence is not explained specifically.

Program Structure of Game Software (Entire Structure)

The following table 2 shows the program structure on the main RAM during execution of the game software used in the above-described various systems.

TABLE 2

Figure 8:
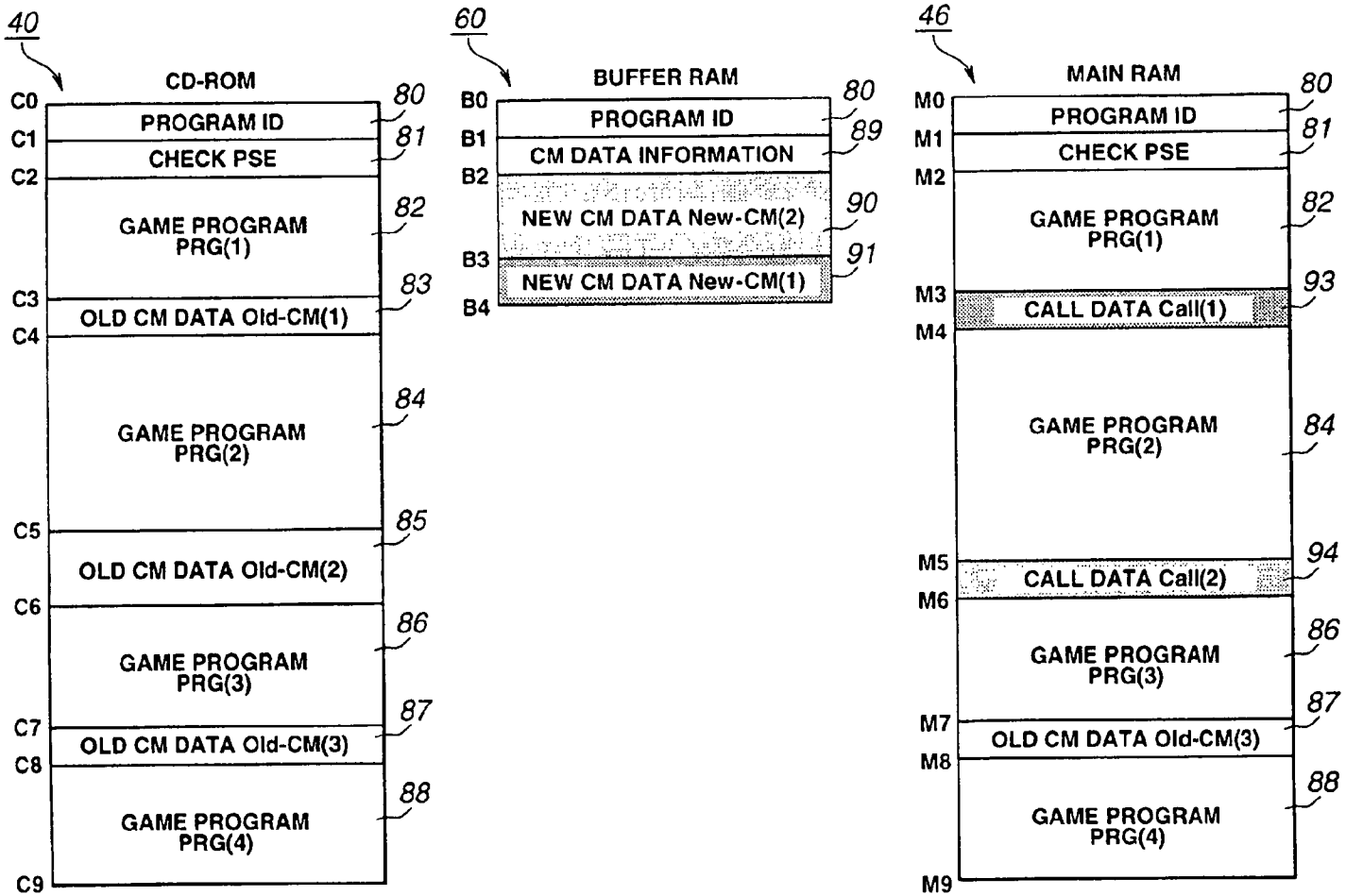
FIG. 8 shows the manner in which, in a game dedicated machine embodying the present invention, an address of a buffer RAM holding updated data is recorded in the main RAM and the data is called out during the game.
Figure 9:
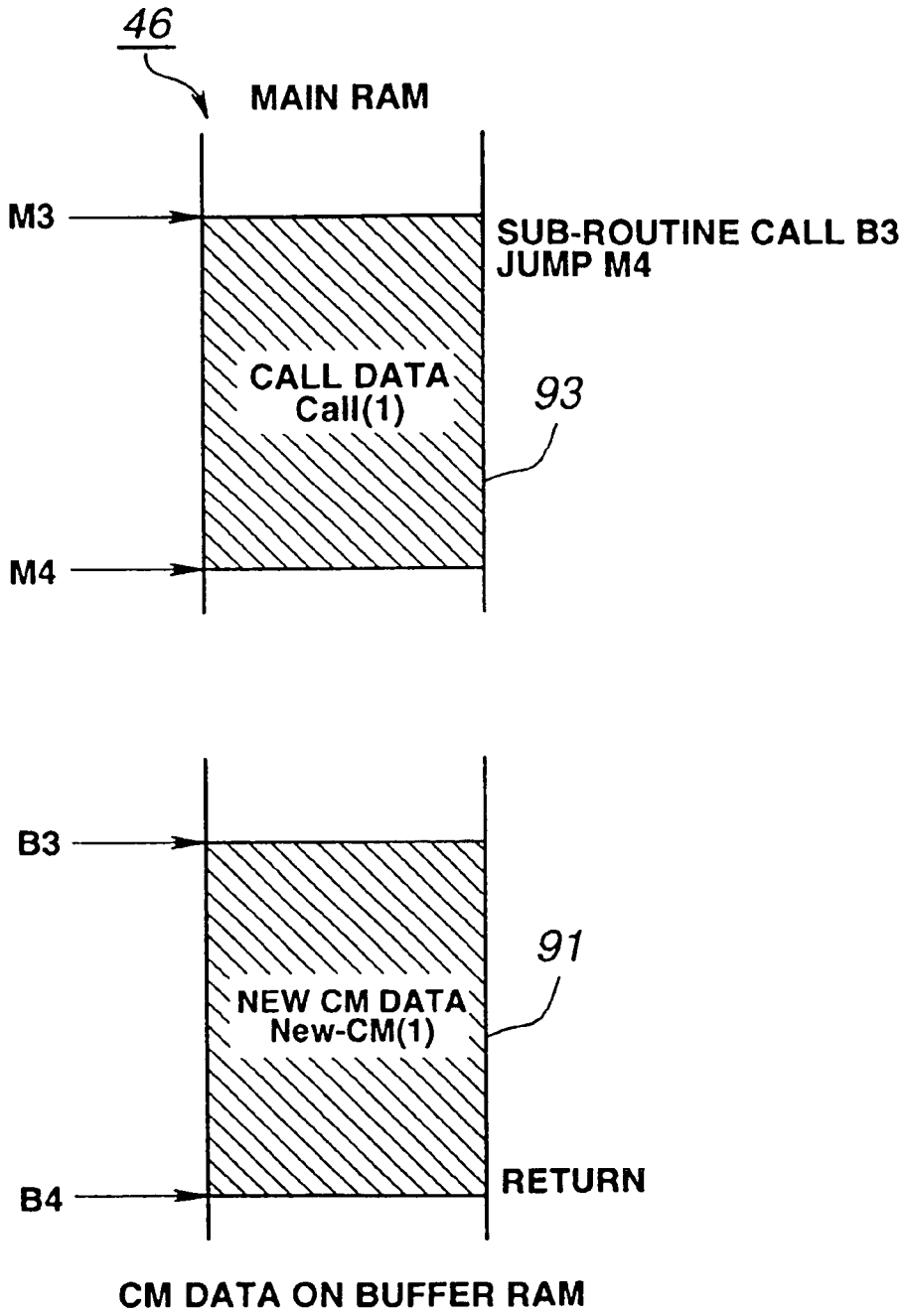
FIG. 9 shows details of the call-out method in a main RAM of FIG. 8.
Figure 13:
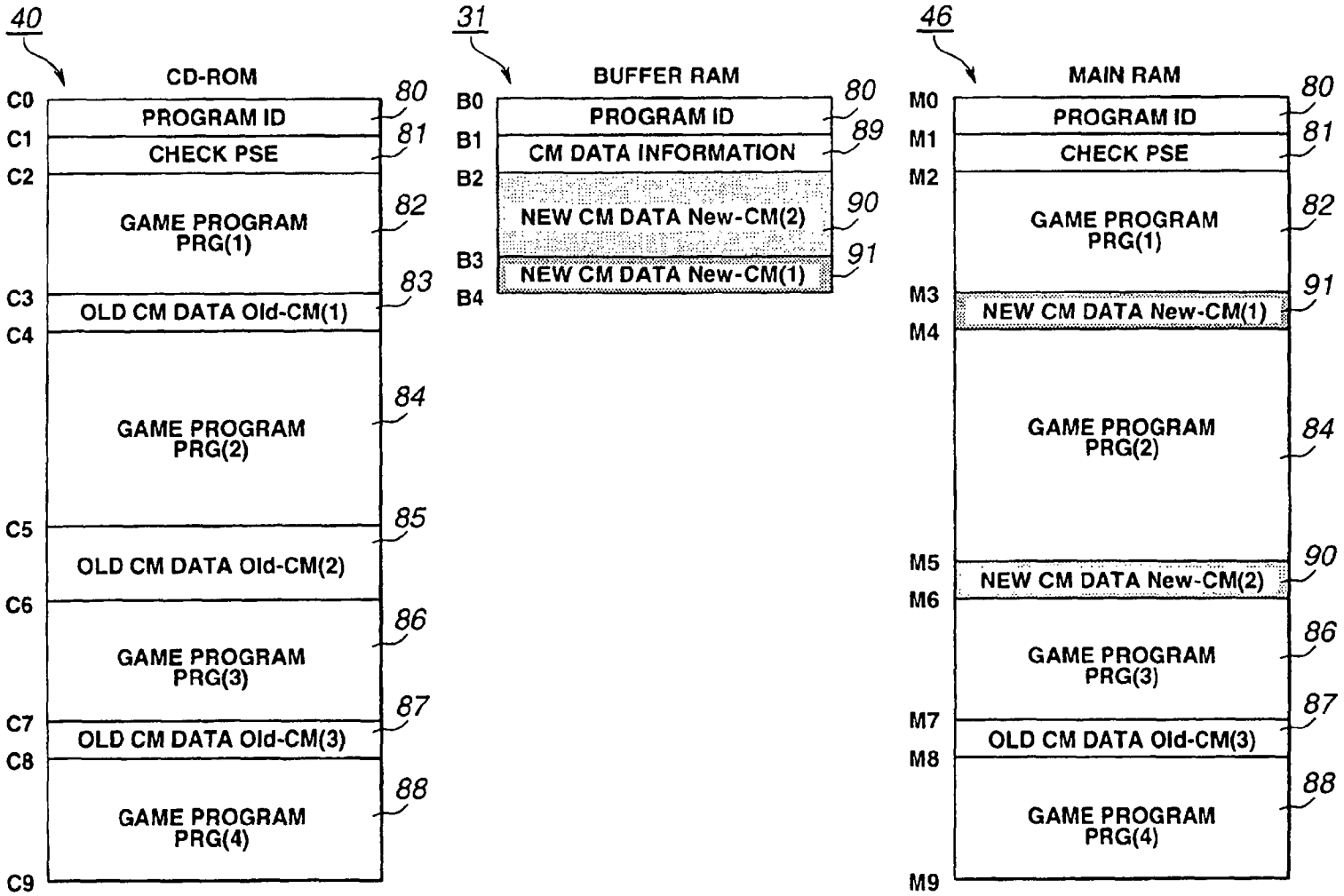
FIG. 13 shows new CM data as such being built into the main RAM.

| equipment | game program (including first CM data or the like) | updated CM data or the like | associated receiving side system | how to handle updated CM data or the like in main RAM | drawings | call-out method |
|---|---|---|---|---|---|---|
| game dedicated machine | CD-ROM | buffer RAM | FIG. 4 and FIG. 6 | updated CM data or the like pre-built | FIG. 13 | |
| | | | | call out updated CM data or the like | FIG. 8 | FIG. 9 |

TABLE 2-continued

Figure 10:
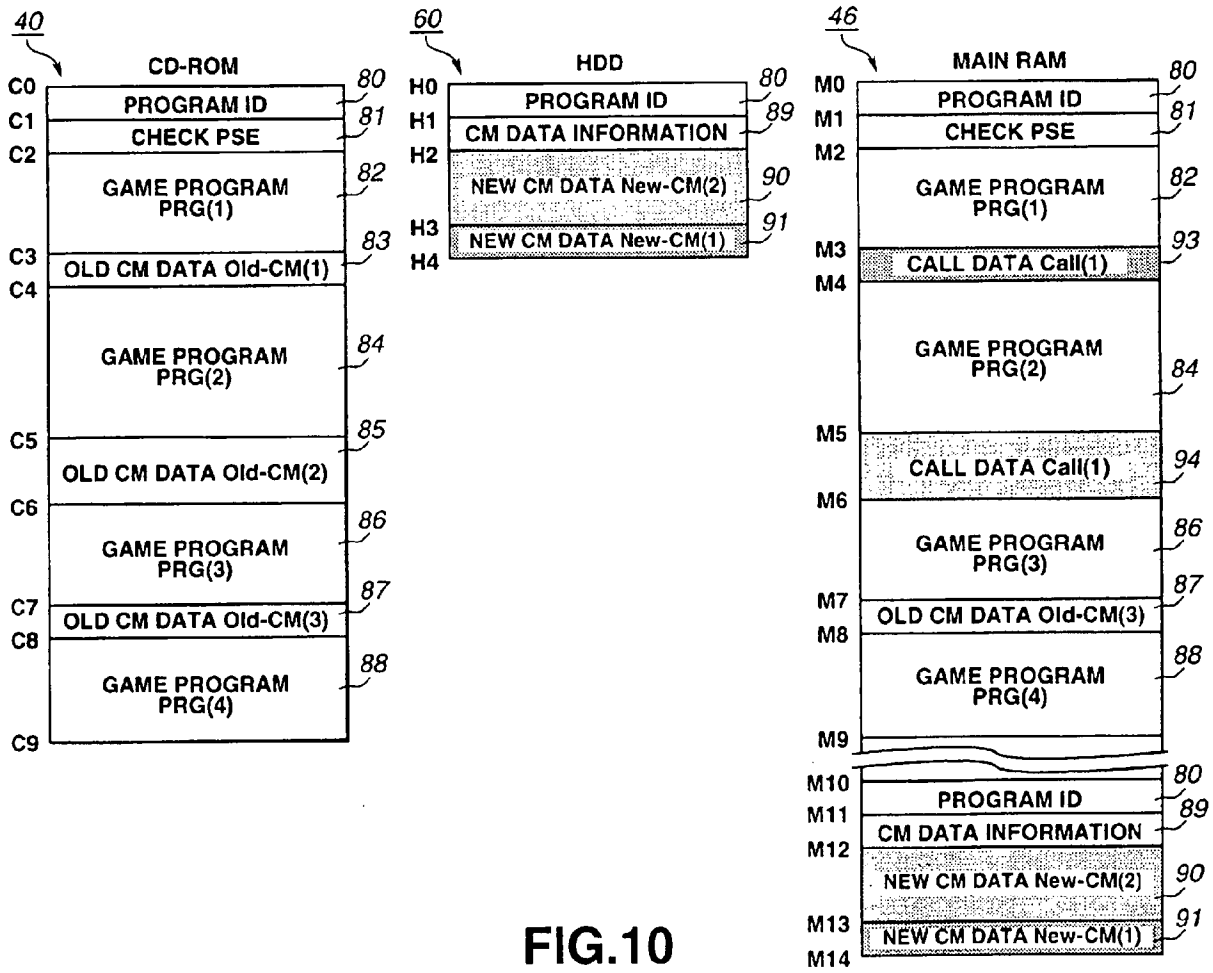
FIG. 10 shows a case of using a personal computer embodying the present invention in which updated data is recorded in other portions of the main RAM, an address of the updated data is recorded in a corresponding portion of the game software and in which the data is called out during the game.
Figure 11:
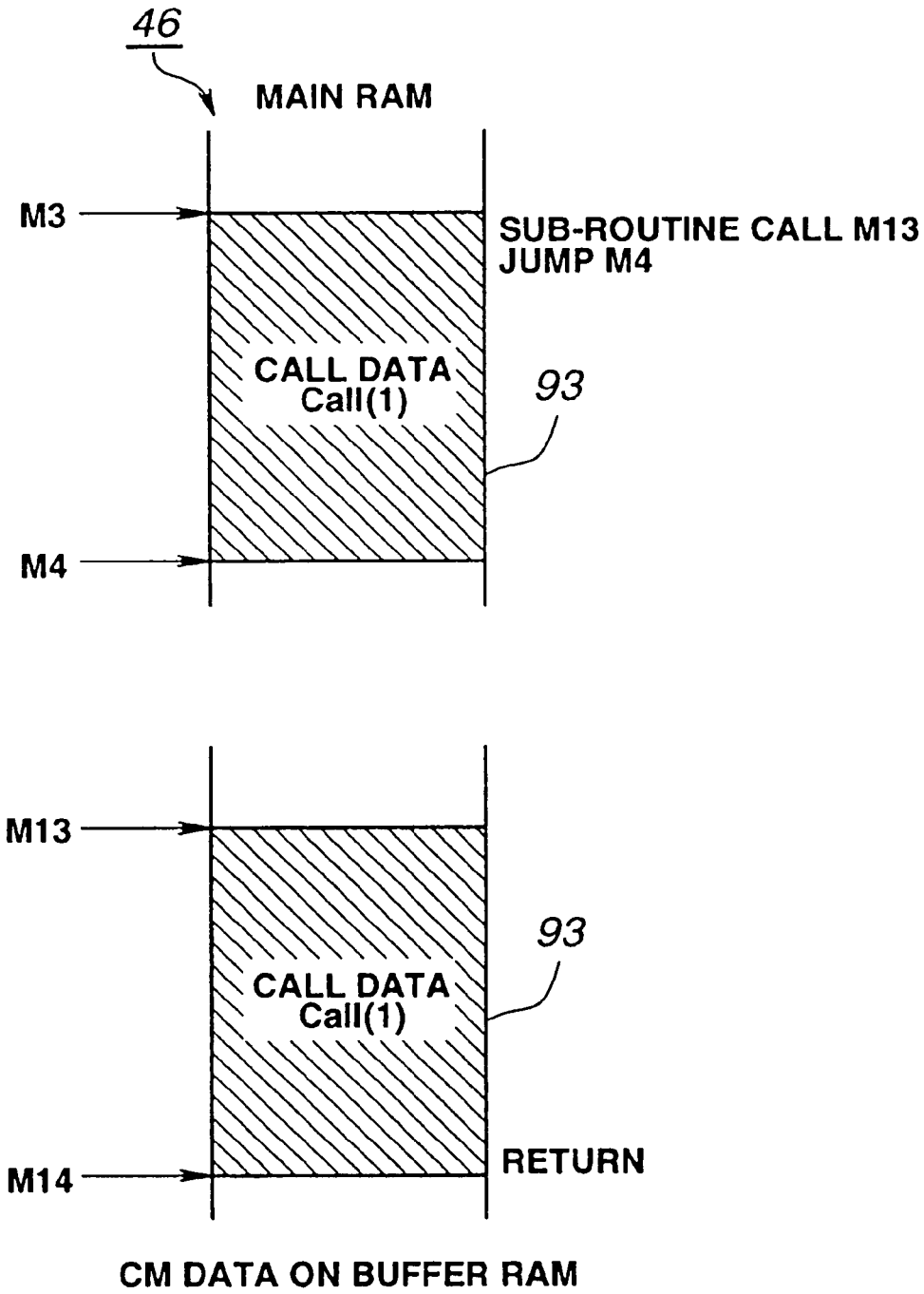
FIG. 11 shows details of the call-out method in the main RAM in FIGS. 10 and 11.
Figure 12:
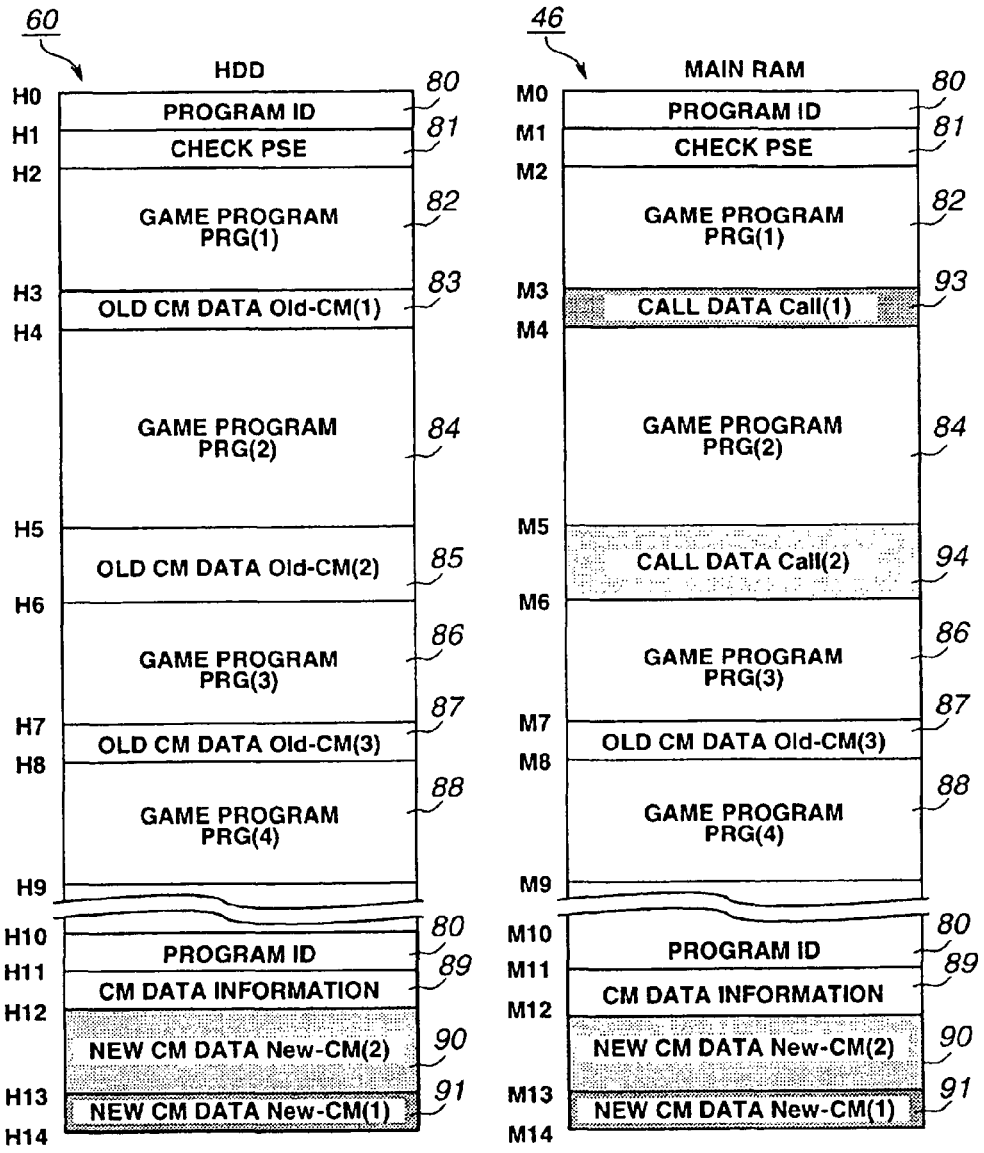
FIG. 12 is a similar view to FIG. 10 of the embodiment of the present invention showing the downloading of a game program.

| equipment | game program (including first CM data or the like) | updated CM data or the like | associated receiving side system | how to handle updated CM data or the like in main RAM | drawings | call-out method |
|---|---|---|---|---|---|---|
| PC | | HDD | FIG. 5 and FIG. 7 | from buffer RAM call out updated CM data or the like from main RAM | FIG. 10 | |
| | HDD of down-loaded PC | | FIG. 7 | | FIG. 12 | FIG. 11 |

The game machine of the receiving side system is classified into the game dedicated machine and the personal computer (PC), as described above. The game program, inclusive of the original old CM data, is mainly recorded on the CD-ROM purchased by the user. If the game program is downloaded, as an exceptional case, the game program is directly recorded on the HDD of the personal computer. The updated new CM data or the like is recorded from the transmitting side via the broadcast system or the communication system on the buffer RAM or on the HDD if the receiving side system uses the game dedicated machine or the personal computer, respectively. The correspondence to the receiving side system, explained with reference to FIGS. 4 to 7, is shown in Table 2.

The game is executed in accordance with the game software on the main RAM transferred from this CD-ROM or from the HDD. If the CM data or the like in the game software recorded on the main RAM is modified or updated with progress of the game, the manner of handling the new CM data is classified, as explained with reference to FIGS. 8 to 13.

Stated briefly, the new CM data or the like is not assembled into the game dedicated machine, but the address of the buffer RAM of the updated data is recorded in the main RAM and the updated data is called for in the buffer RAM, as shown in FIG. 8. The call-out method is shown in detail in FIG. 9.

The updated data as such is not recorded in pertinent portions of the game software of the main RAM, but is recorded in other portions of the same main RAM, while the address of the updated data is recorded in the pertinent portions of the game software and the updated data is called out from the other addresses on the main RAM, as shown in FIG. 10. The call-out method is shown in detail in FIG. 11.

FIG. 12 shows case similar to FIG. 10 with the exception that the game program is downloaded on the HDD 6.

FIG. 13 shows a case of assembling the new CM data or the like as such in the main RAM (sub-routine call).

Program Structure

Calling New CM Data on Buffer RAM on Main RAM

FIG. 8 shows a first embodiment of the present invention in which, when transferring the game software on the CD-ROM 40 to the main RAM 46, in the game dedicated machine 52, any new CM data on the buffer RAM 31, if any, is left as is and only the data of the sub-routine call is left in the main RAM 46, such that, if an area of the CM data in the main program on the main RAM 46 to be updated is reached, the CM data is sub-routine called (called out). This can be adopted in the system of FIGS. 4 and 6.

The CD-ROM 40 has recorded thereon program ID data 80, PSE check data 81, game program PRG(1) data 82, old CM data Old-CM(1) 83, game program PRG(2) data 84, game program PRG(3) data 86, old CM data Old-CM(3) 87 and game program PRG(4) data 88, in this order. The old CM data Old-CM(1) 83 to Old-CM(3) 87 are not limited to the CM data but is the CM data or the like also encompassing the pictures to be updated, such as car or flag colors explained with reference to FIGS. 1 and 2. On the buffer RAM 31 are recorded the program ID data 80, new CM data New-CM(1) 91 and New-CM(2) 90.

When transferring data of the addresses C0 to C9 on the CD-ROM 40 to the main RAM 46, data of the addresses C0 to C9 on the CD-ROM 40 are directly transferred to the addresses M0 to M9 on the main RAM 46. The addresses of the transferred CM data or the like for updating on the main RAM 46 are calculated and the leading end of the CM data or the like to be updated is rewritten to the sub-routine call command and to the jump command.

After this rewriting, the old CM data Old-CM(1) is rewritten to call data Call(1) 93, while old CM data Old-CM(2) is rewritten to call data Call(2) 94 for calling new CM data new-CM(2). An address B3 of the new CM data New-CM(1) 91 is recorded in the call data 93, while an address B2 of the new CM data New-CM(2) 90 is recorded in the call data 94.

The characteristic portions of this program are explained in detail with reference to FIG. 9. As explained with reference to FIG. 8, if the new CM data is on the buffer RAM 31, sub-routine calling is made to the address B3 on the buffer RAM 31 at the leading end of the call data Call(1) 93 of the program on the main RAM 46. Conversely, the new CM data New-CM(1) (91) on the buffer RAM 31 is returned by return, so that, at an end of processing, control is at a point next to the sub-routine call of the call data Call(1) 93 on the main RAM 46. Since this portion contains a jump command of skipping to an address Magnetic disc device 4 on the main RAM 46, the data of the previously written data of the addresses Magnetic head device 3 and Magnetic disc device 4 are disregarded.

Calling New CM Data on the Same Main RAM on the Main RAM

FIG. 10 shows a case in which, when transferring the game program data on the CD-ROM 40 to the main RAM 46, the new CM data on the HDD 60 is not transferred to a corresponding area on the main RAM 46, but is transferred to a different area. In the game program on the main RAM 46, the new CM data in this different area is subroutine-called. A large-capacity main RAM, capable of having data of the CD-ROM 40 and HDD 60 simultaneously, may be conceived. This main RAM can be used in the system of FIGS. 5 and 7.

As in FIG. 8, if the addresses C0 to C9 on the CD-ROM 40 are transferred to the main RAM 46, data of the addresses C0 to C9 on the CD-ROM 40 are directly transferred to the addresses M0 to M9 on the main RAM 4.6. The program ID80, CM data information 89 and the new CM data 1, 2 (91,90) at the addresses H0 to H4 on the HDD 60 are then transferred to the addresses M10 to M14 in a different area from the game software of the main RAM 46.

The address on the main RAM 46 of the post-transfer CM data for updating is calculated, based on the CM data information in the different area on the RAM 46, and the leading end of the data to be rewritten is rewritten to a sub-routine call command and a jump command. The old CM data Old-CM (1) 83 and the old CM data Old-CM(2) 85 are rewritten to call data Call(1) 93 for calling the new CM data New-CM(1) and to call data Call(2) 94 for calling the new CM data New-CM (2), respectively.

FIG. 12 shows a case of downloading the game software in which, in the personal computer 68, a program is had in HDD 60, data on the HDD 60 is transferred to the main RAM 46, and new CM data or the like on the HDD 60 is transferred to an area new CM data or the like on the main RAM 46 is sub-routine called in the main program on the main RAM 46. This can be used in the system of FIG. 7. As compared with FIG. 10, only the origin of transfer is changed from the CD-ROM 40 to the HDD 60 (directly recorded by the downloading).

The data of the addresses H0 to H9 on the HDD 40 is directly transferred to the addresses M0 to M9 on the main RAM 46. The program ID data 80, CM data information 89 and the new CM data 90, 91 at the addresses Head supporting driving unit 10 to H14 on the HDD 60 are transferred to the addresses M0 to M14 which represent different areas from the game software transferred to the main RAM 46. Then, based on the CM data information 89 on the different area on the main RAM 46, the addresses of the main RAM 46 of the new post-transfer CM data are calculated and the leading end of the CM data being transferred is rewritten to the sub-routine call commands and the jump commands. The old CM data Old-CM(1) 83 and the old CM data Old-CM(2) 85 on the main RAM 46 are rewritten to the call data Call(1) 93 and to call data Call(2) 94, respectively.

FIG. 11 shows details of the rewritten data in meeting with FIGS. 10 and 12. As compared to FIG. 9, already explained, the new CM data or the like is not on the buffer RAM but on the main RAM 46. Sub-routine calling is to the address M13 of the different area on the main RAM 46 at the leading end of the call data Call(1) 93 on the main RAM 46. The new CM data New-CM(1) (91) is returned by return, so that, at an end of processing, control is at a point next to the sub-routine call of the call data Call(1) 93 on the main RAM 46. Since this portion contains a jump command of skipping to an address Magnetic disc device 4 on the main RAM 46, the data of the previously written data of the addresses Magnetic head device 3 and Magnetic disc device 4 are disregarded.

Instance of Assembling Updated CD Data on the main RAM

FIG. 13 shows a case wherein, when transferring the game software on the CD-ROM 40 to the main RAM 46 in the game dedicated machine 52 exploiting the broadcast system or the communication system, the new CM data or the like on the buffer RAM 31 is also sent to the main RAM 46 so as to be assembled to the main program. This can be used in the system of FIGS. 4 and 6.

In the CD-ROM 40, there are sequentially recorded program ID data 80, PSE check data 81, game program PRG(1) data 82, old CM data Old-CM(1) 83, game program PRG(2) data 84, old CM data Old-CM(2) 85, game program PRG(3) data 86, old CM data Old-CM(3) 87 and game program PRG(4) data 88, are recorded sequentially. The old CM data Old-CM(1) to Old-CM(3) are not limited to the CM data but is the CM data or the like also encompassing the pictures to be updated, such as car or flag colors explained with reference to FIGS. 1 and 2.

The addresses C0 to C9 on the CD-ROM 40 are loaded on the main RAM 46 (corresponding to the buffer RAM 31 of FIGS. 4 and 6). On the buffer RAM 31 are recorded the program ID data 80, CM data information 89, new CM data New-CM(1) 91 and New-CM(2) 90. The CM data information 89 is the CM data management information filing the address of the buffer RAM 31 recording the new CM data or the like and the address of the CD-ROM 40 recording the corresponding old CM data or the like. Although the CM data Old-CM(1) and CM data Old-CM(2) are updated, the CM data Old-CM(3) is not updated. Thus, the first old CM data or the pre-updating data are commended to be used.

If, during data transfer from the CD-ROM 40 to the main RAM 46, there is an address on the CD-ROM 40 of the CM data or the like being updated in the CM data information 89 of the buffer RAM 31, the origin of transfer switches from the CD-ROM 40 to the buffer RAM 31, such that pre-set new CM data form the buffer RAM 31 is transferred. After the end of this transfer, the processing reverts to data transfer from the CD-ROM 40.

The game software data are sequentially read out from the address CO on the CD-ROM 40 so as to be sequentially stored beginning from the address M0 on the main RAM 46. When the site of transfer is the address C3 of the CD-ROM 40, transfer switches to the transfer of the CM data New-CM(2) 90 from the address B2 of the buffer RAM 31, because the old CM data Old-CM(2) 85 is to be updated and the corresponding address Cartridge 5 is at the CM data information 89 on the buffer RAM 31. When the address B3 is reached, transfer again switches to transfer from the address C6 of the CD-ROM 40.

Then, when the address of the CD-ROM 40 reaches Center hub 7, since the old CM data Old-CM(3) 87 is not to be updated, the address Center hub 7 is not recorded in the CM data information 89 of the buffer RAM 31. Thus, data transfer is continued, with the CM data 3 remaining to be the old CM data Old-CM(3) 87, to terminate data transfer at address C9.

Thus, new CM data New-CM(1) 91 and new CM data New-CM(2) 90 are written on the main RAM 46 in place of the old CM data Old-CM(1) 83 and old CM data Old-CM(2) 85 on the CD-ROM 40. However, the CM data 3 is written on the main RAM 46 as the old CM data Old-CM(3) 87.

Since in general the capacity of the main RAM 46 is smaller than that of the CD-ROM 40, the game is executed as necessary data is transferred from the buffer RAM 31 to the main RAM 46 when the corresponding address is reached in the course of execution of the game program. When the CM data area is reached on the game software, reference is had to the CM data information on the buffer RAM to capture the data from the buffer RAM if necessary to execute the game.

Figure 14:
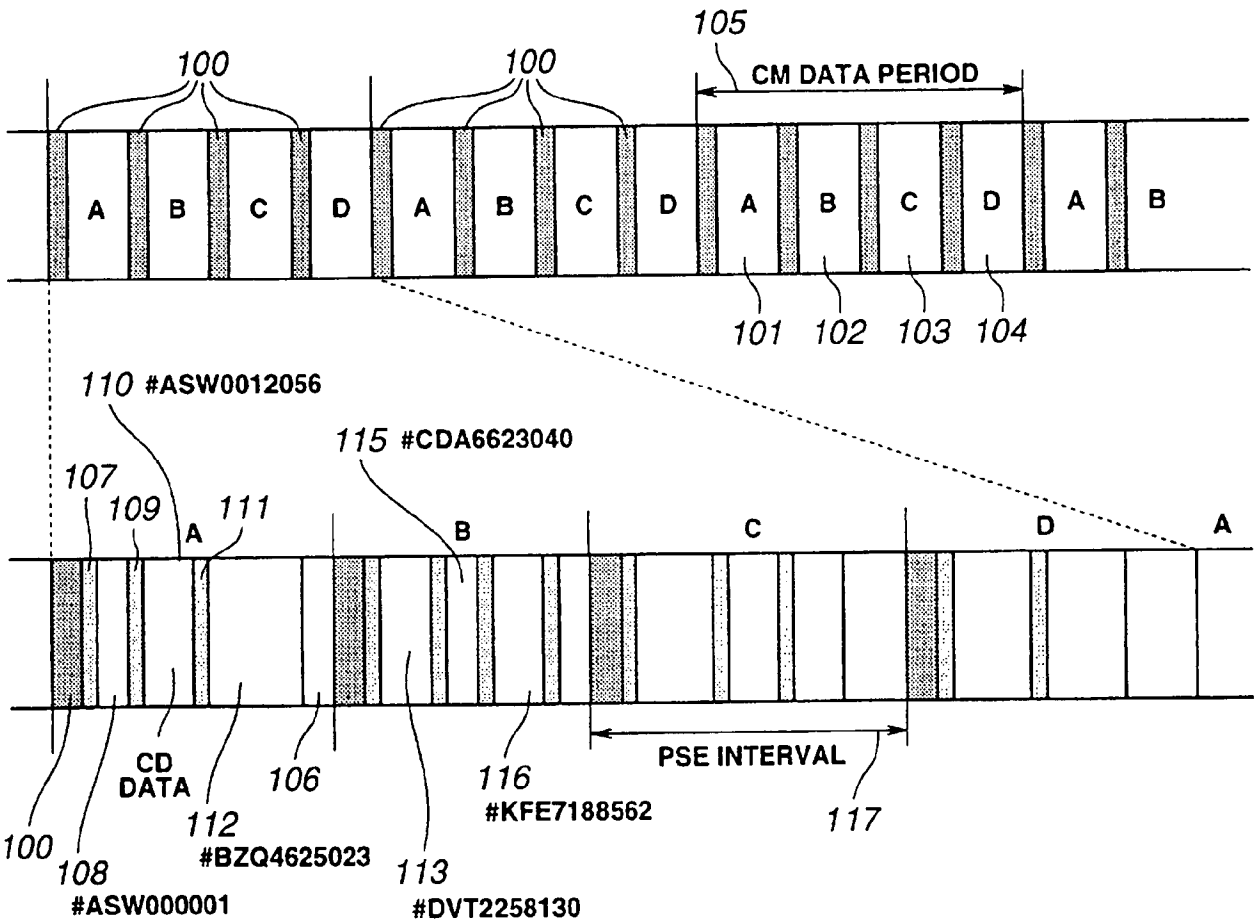
FIG. 14 shows a broadcast format of data inclusive of the new CM data sent from the transmitting side system taking advantage of the broadcast system embodying the present invention.
Figure 15:
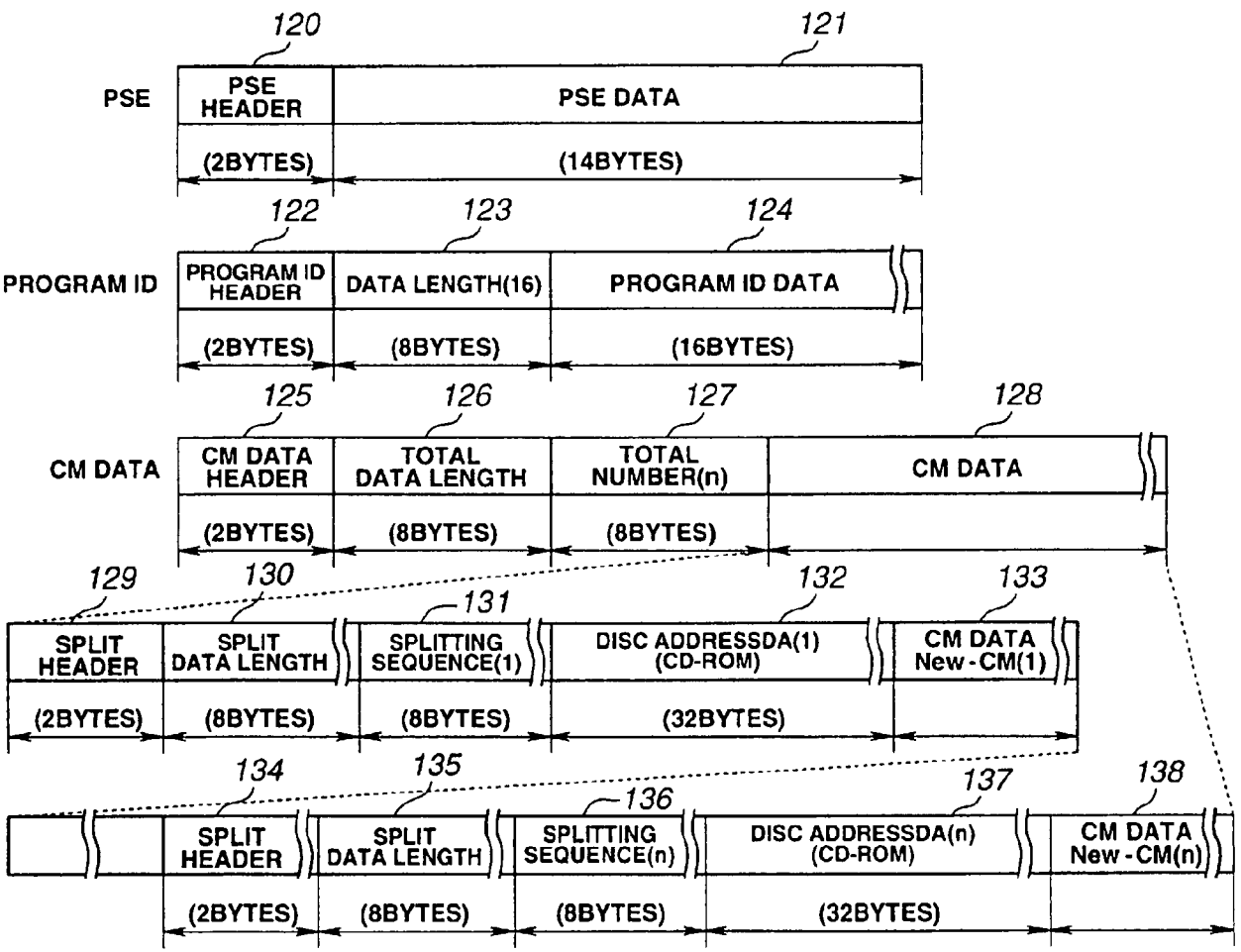
FIG. 15 shows details of the PSE of the broadcast format shown in FIG. 14, program ID and the CM data.
Figure 16:
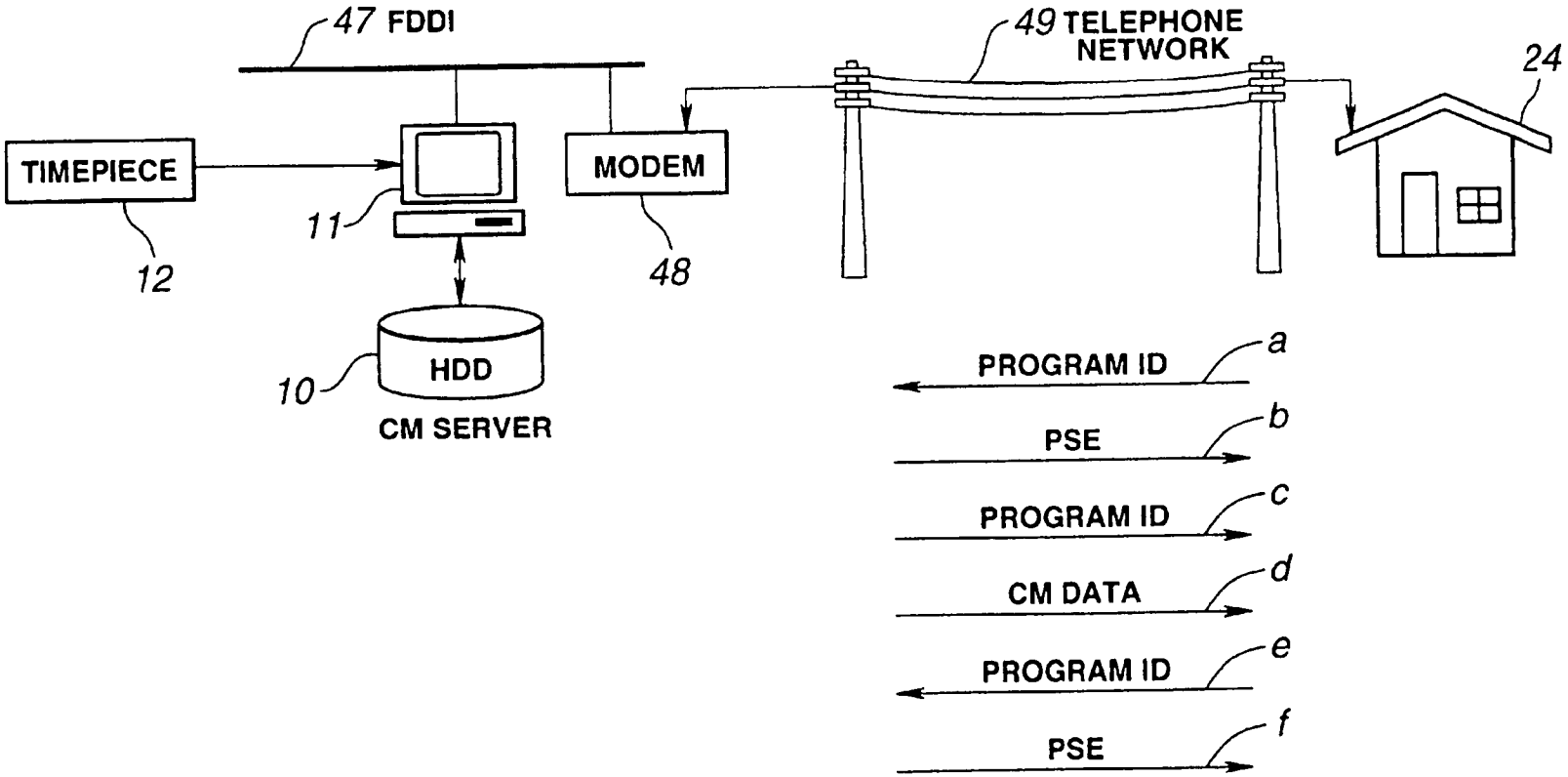
FIG. 16 shows the protocol in the case of utilizing the communication system embodying the present invention.

Date Format Exploiting the Broadcast System and Communication Protocol Exploiting the Communication System Data Format Exploiting Broadcast System It has been explained by Table 2 that the new CM data or the like is supplied to the receiving side system by exploiting the broadcast system or the communication system. Referring to FIGS. 14 to 16, the communication protocol during transmission of the new CM data in the communication system, such as the new CM data or the like in the broadcast system.

In the broadcast system, new CM data is sent from the sending side broadcast station to the receiving side system by unidirectional communication. FIG. 14 shows the broadcast format of data containing the new CM data supplied from the broadcast station. As shown therein, data made up of four blocks of A to D are repeatedly broadcast at an interval corresponding to a CM interval 105.

Each of the blocks A to D are started at the program start enable (PSE) signal 100. The length of each block, that is the interval from the PSE signal to the next block PSE signal is termed a PSE interval 117, and is of a pre-set data length. The PSE 100 is a program start enable signal. If the receiving side game dedicated machine or personal computer can confirm the arrival of the PSE 100, the game program is started. Stated differently, the game software starting is inhibited if the arrival of the PSE 100 cannot be confirmed. That is, the game software not having the CM data or the like cannot be started.

As shown in the lower part of the figures, each of the respective blocks A to D has, next to the PSE 100, the program ID, also referred to as 'program code', and plural sets of CM data (such as sets of 107 and 108) associated with the program ID. First, the program ID is read, and the CM data coincident with the program ID is captured into the game machine. The block A (code 101) has three new CM data associated with three program codes, namely '#ASW000001', '#ASW0012056' and '#BZQ4625023'. To these CM data are accorded the corresponding program identification signals as headers.

First, there is the PSE 100, followed by the program ID107 and associated CM data '#ASW000001' 108, followed by the program ID 109 and associated CM data '#ASW0012056' 110, finally followed by the program ID 111 and associated CM data '#BZQ4625023' 112. Since the block length (PSE interval 117) is constant, the deficit portion is made up for by the gap 106 to complete a block. The block B is constituted by the CM data of different sorts from the block A. These blocks A to D of the same contents, making up the sole CM interval 105, are broadcast repeatedly sequentially.

In the course of the CM interval 105, at least one new CM data is transferred. If there is no arrival of CM data during the CM interval 105, there is no broadcast CM data, such that the CM data is not updated. If the game software is an old one used for some long time since its first sale, the number of users is few, such that, if the CM data is updated, the effect is only small so that new CM data is not broadcast. If the new CM data is not broadcast, the game program can be started if the arrival of the PSE 100 is confirmed. In this case, the old CM data or the latest updated CM data on the game program is reproduced.

In the CM interval 105, the PSE interval 117 is set at a pre-set interval, such as ¼ interval. The software can be started by receiving this PSE signal. For smoothing the start-up of the software, this interval is selected to be shorter than the CM interval 105. The startup of the game software is inhibited if the arrival of the PSE 100 cannot be confirmed, without dependency on updating/non-updating.

FIG. 15 shows details of the signal data formats of the PSE 144, program ID 145 and the new CM data 146.

The PSE 144 is made up of a PSE header (2 bytes) 120 and PSE data (14 bytes) 121. The PSE data 121 has inserted therein the software start enable code and time data. Since there is the time data, the PSE data is varied with time such that the data is variable each time the game software is started. Thus, the data security (confidentiality) is secured such that, by checking the PSE data, the startup of a game with non-updated CM data is inhibited effectively. The PSE data will be explained in detail with reference to FIGS. 17, 18 and 27.

The program ID (program code) 145 has the program ID header (2 bytes) 122, a data length (8 bytes) 123 indicating the length of the next following data and the program ID data (16 bytes) 124. The program ID data 124 is fixed at 16 bytes, so that the data length 123 is always '16'.

The CM data 146 has a CM data header (2 bytes) 125, a total CM data length (8 bytes) 126 and a total item number data 127 specifying the total number of divisions or the total item number (8 bytes) specifying to which data sites corresponds the next following CM data. These data are followed by the new CM data 128 for updating.

The new CM data for updating 128 is divided by a number corresponding to the total item number n shown by the total item number data 127. Each of the n portions of the CM data has a division header (2 bytes) 129, a division data length (8 bytes) 130, specifying the length of the next following divided data portions, the division number (8 bytes) 131 specifying the serial number of the divided data portions and the CD program address (32 bytes) 132 specifying the address of the main program on the CD-ROM, followed by the new CM data New-CM(1) 133 for actual updating. This sequence is repeated up to the n'th divided data portion (CM data New-CM(n)) 138 specified by the total number of divisions, that is the total item number data 127.

Communication Protocol Utilizing the Communication System

On the other hand, if the communication system is used, first the game is started with the game dedicated machine or the personal computer of the receiving side system and the program ID is read and sent over the telephone network 49 to the sending side system by way of preforming bidirectional communication. FIG. 16 shows schematics of the protocol in the communication system. The exchanged data format is the same as that shown in FIGS. 14 and 15.

Referring to FIGS. 6, 7 and 16, if the game software stored in the CD-ROM 40 is started, the program ID signals are acquired from the CD-ROM 40. These program ID signals are sent from the home 24 to the CM server controlling computer 11 (arrow a in FIG. 16).

The CM server controlling computer 11, which has received the program ID signals, retrieves the CM data associated with the program ID signals from the HDD 10 which is the CM server. After the end of the retrieval, the CM server controlling computer 11 returns the PSE signals 141, program ID 142 and the CM data 143, in this order (arrows b, c and d in FIG. 16).

The second PSE signal is then acquired, as later explained. That is, the program ID signal is again sent from the home 24 to the CM server controlling computer 11, while the PSE signal is returned from the CM server the home 24.

In the home 24, the time information of the PSE signal, indicated by arrow b of FIG. 16, is compared at the home 24 to the PSE signal indicated by arrow f to judge the two PSE signals to be correct if the error is within a pre-set allowable value to permit the start of the game, whereas, if the error exceeds the allowable value, the two PSE signals are judged to be in error to terminate the operation. Meanwhile, if the long time has elapsed since the first sale of the game software, such that there is no corresponding CM data on the HDD 10, only the PSE signals and the program ID are returned. The receiving side system can confirm arrival of the PSE signals to permit the start of the game software. Meanwhile, in this protocol, the program ID is not indispensable, but is used only for confirmation purposes.

Encoding and Decoding of PSE Signals

A specified insertion code, as set by the game software producer, is inserted into the PSE signals, and the receiving side system judges the coincidence or non-coincidence of the insertion code for determining whether or not the game can be started.

Encoding

The PSE has the time information and hence is changed with time so that it is effective in safety, as described above. Referring to FIGS. 17 and 18, encoding and decoding examples for the PSE signals in the CM server controlling computer 11 will be explained.

FIG. 17 is an example of encoding. For the PSE signals, the time of the reference timepiece 12 is used. This time is acquired as the date and time of distribution (year, month, day, hour, minute and second) (1996.2.29, 18:05:38' and is symbolized as shown at B in FIG. 17. The symbolized signal is then re-ordered so that the MSB side and the LSB side are interchanged with each other, as shown at C in FIG. 17, to provide the symbol sequence in the order of the decreasing rate of change (second→year). The leading end at the beginning of the game is formed by a sort of random numbers for thereby specifying the point of insertion of the insertion data as now explained.

The leading end number of the re-arrayed signal is acquired (D in FIG. 17). This number is '8' in the present embodiment. There is no change up to the leading end number (8) as counted from the leading end. However, the insertion code is inserted at the next point (9th point). In the present embodiment, the insertion code is 'ok'. After the insertion code, the n'th data ff. are shifted and continued (E in FIG. 17). Conversion is made to the 8-bit data in accordance with JIS (F in FIG. 17).

The dummy data code, optionally set by the game software producer, is acquired. The dummy data may differ from one game software to another. In the present embodiment, the dummy code is 'startok' (G in FIG. 17). Similarly, the dummy code (G in FIG. 170) is also converted into JIS 8-bit data (H in FIG. 17). These two 8-bit data (F and H in FIG. 17) are added together bit-by-bit to give an addition data (I in FIG. 17). To this addition data are appended the PSE header '03h, f7h' and the resulting PSE is encoded and transmitted (J in FIG. 17).

Encoding Flowchart

FIGS. 19 to 22 show the PSE encoding flowchart. The encoding processing is carried out by the CM server controlling computer 11 in FIGS. 6, 7 and 16.

Figure 19:
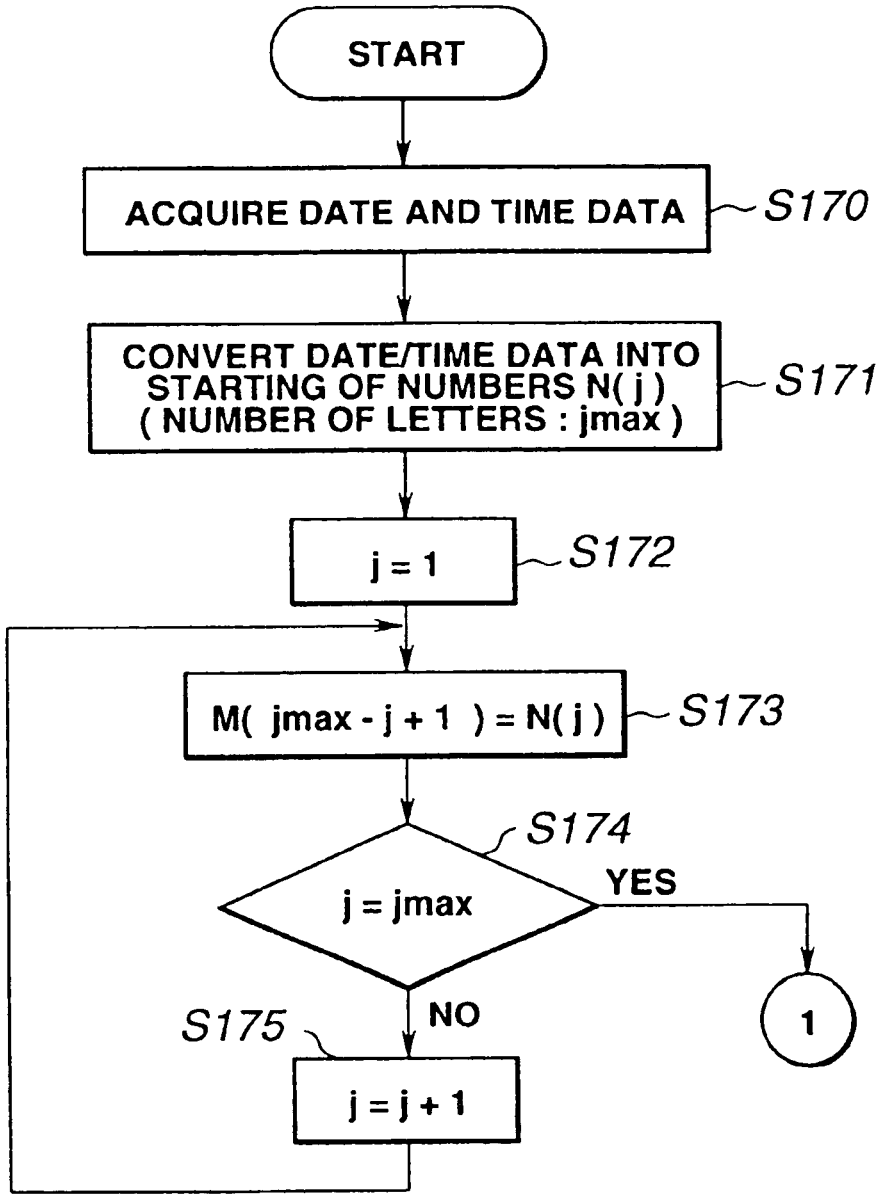
FIG. 19 shows a flowchart of encoding the PSE signals in connection with FIG. 17 in an embodiment of the present invention and specifically showing the flowchart of inversion of data and time data.

FIG. 19 is a flowchart up to re-arraying at the time of PSE encoding.

First, at step S170, the date and time data is acquired. Then, at step S171, the date and time data is converted into a string of numerical figures N(j). The string of numerical figures prior to re-arraying in N(j) and that subsequent to re-arraying is M(j), where j specifies the serial number in the string. The number of numerical figures in the date and time data jmax is 12 in the embodiment of FIG. 17. At step S172, j is set to 1 (j=1). At steps S173, S174 and S175, the operations of inserting the j'th data of N into the (jmax−j+1)th place in M is repeated from j=1 to i=jmax (=12). This re-arrays the string of numerical values N(j) of the date and time data so that the MSB side and the LSB side are interchanged to give the string of letters M(j).

Figure 20:
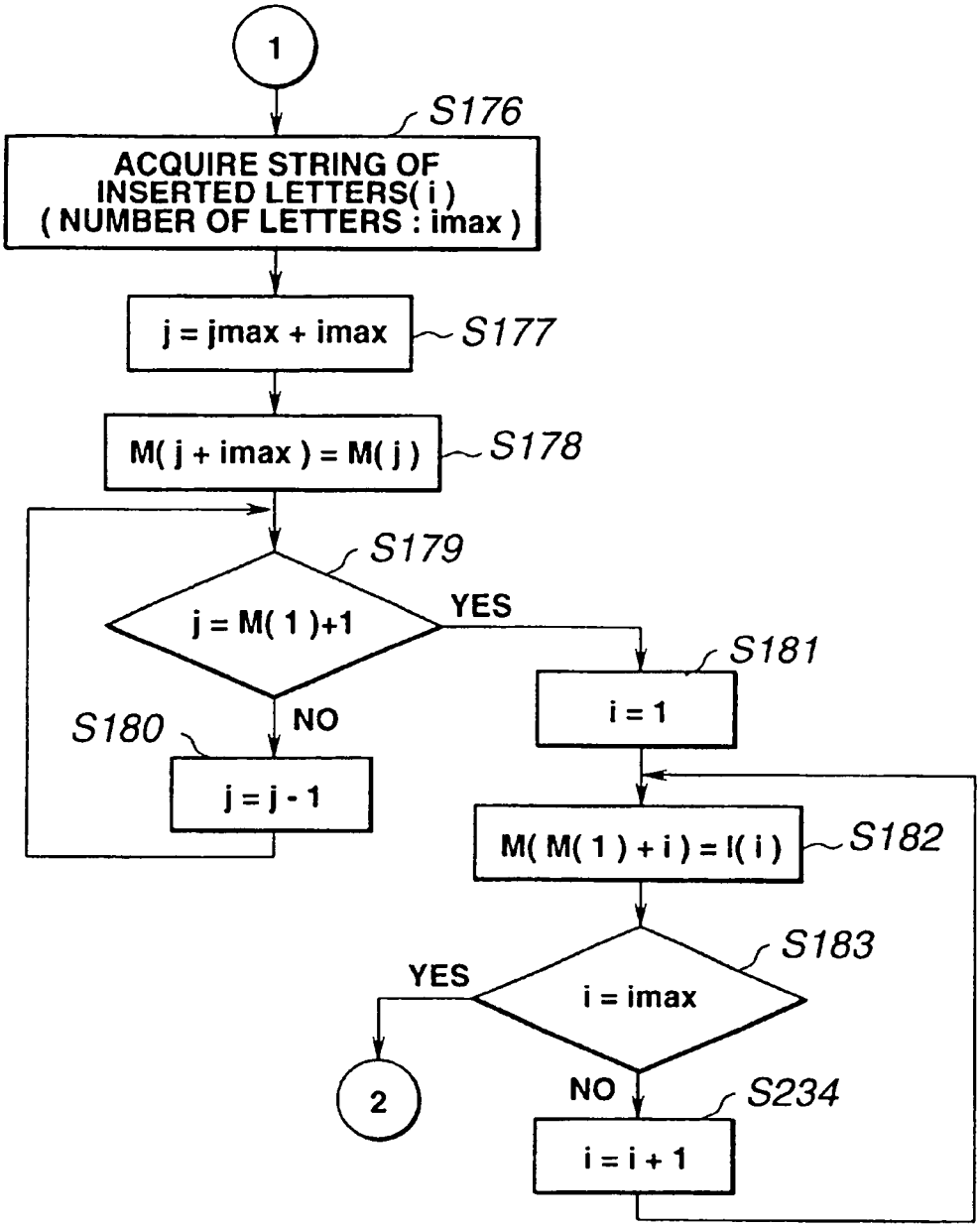
FIG. 20 shows a flowchart of encoding of PSE signals in connection with FIG. 17 in an embodiment of the present invention and specifically showing the manner of appendage of insertion data.

FIG. 20 is a flowchart up to the addition of insertion data (E in FIG. 17), which is carried out next to affirmative judgment of step S174 in FIG. 19. Since the insertion data in FIG. 17 is 'ok', imax=2. Next, at step S177, j is set so that j=jmax+imax=2. Then, at step S177, j is set so that j=jmax+imax (=12+2=14). The data are shifted by imax sequentially from the last letter. Then, at step S178, M(j+jmax)=M(j). From the last portion of the string, the string up to M(1)+1 is shifted by imax. M(1) corresponds to the leading end number of the string M(j). Since the string is unchanged up to this leading end number, the insertion and shifting point is downstream of M(1)+1st letter. At the next step S180, j=j−1. The steps S178 to S180 are repeated until the requirement of the step S179 is met. If the condition of step S179 is met, processing transfers to step S1181 to set i=1. Then, at step S182, M(M(1)+i)=I(i) to insert the insertion code beginning from the M(1)+1st letter. The steps S182, S183 and S184 are then repeated until the condition i=Imax is met at step S183. Is the condition of step S183 is met, processing transfers to step S184 of FIG. 21.

Figure 21:
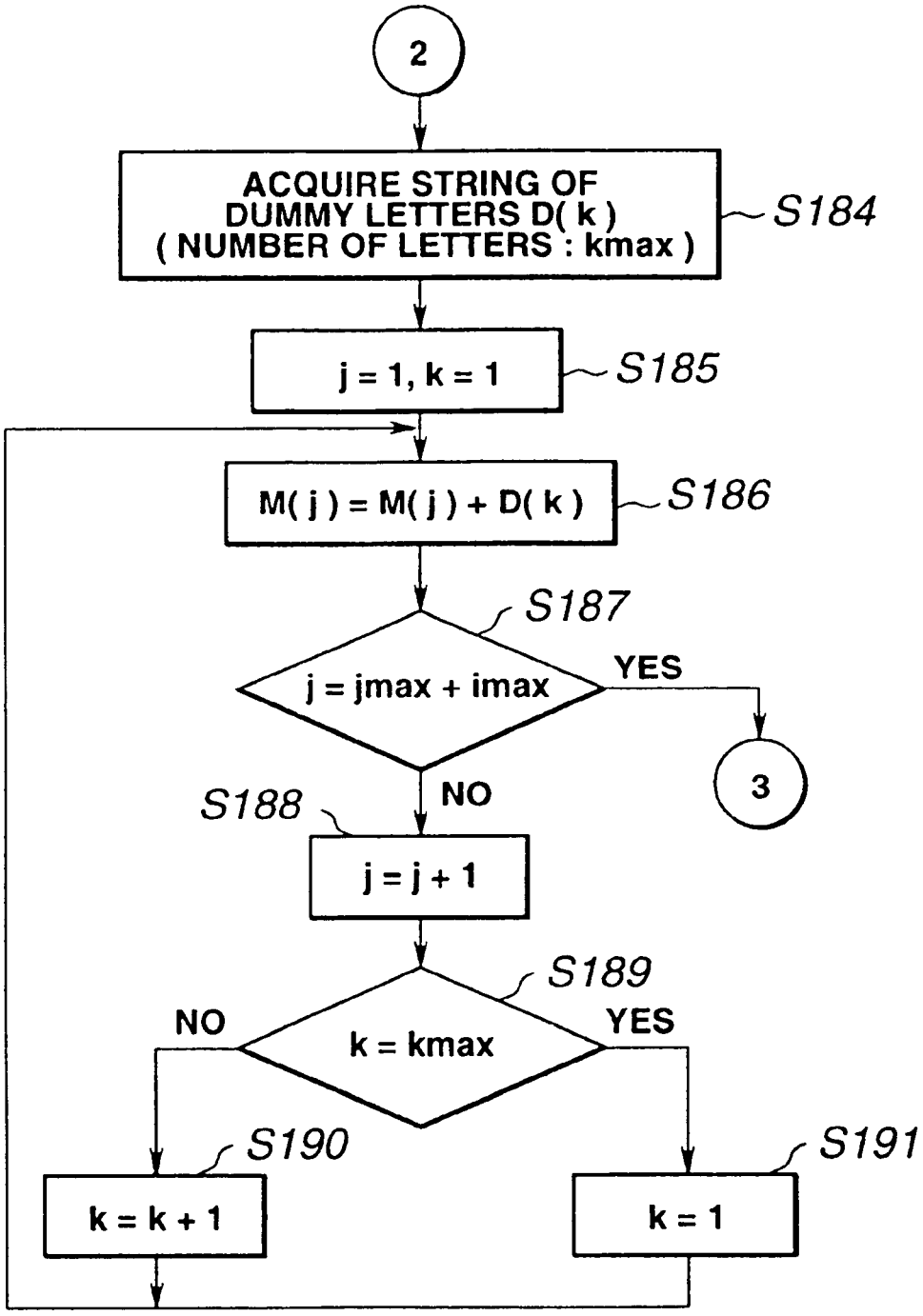
FIG. 21 shows a flowchart of encoding of PSE signals in connection with FIG. 17 in an embodiment of the present invention and specifically showing the manner of addition of dummy data.

FIG. 21 is a flowchart showing the process of PSE encoding of FIG. 17 up to the step of addition of dummy data (I in FIG. 17), and shows the sequence following the affirmative decision at step S183 of FIG. 20.

First, at strep s184, the dummy letter string D(k) is acquired at step S184. Since the dummy data D(k) is 'startok' in FIG. 17, the number of letters kmax is 7. Then, at step S185, j=1 and k=1. At step S186, M(j) and the dummy data D(k) in the same rank in the sequence are sequentially summed beginning from the leading end. At step S188, it is judged whether j−jmax+imax. If the above condition is not met, j is set so that j=j+i at step S188. Then, at step S189, it is judged whether or not k=kmax. If this condition is not met, k is set at step S191 to k=k+1. The steps as from step S186 are then repeated. If the dummy data becomes depleted earlier than the letter string, k is updated and, at step S191, the dummy data is again added beginning from the leading end. If, at step S187, j=jmax+imax, the above addition is terminated and processing transfers to step S192 of FIG. 22.

Figure 22:
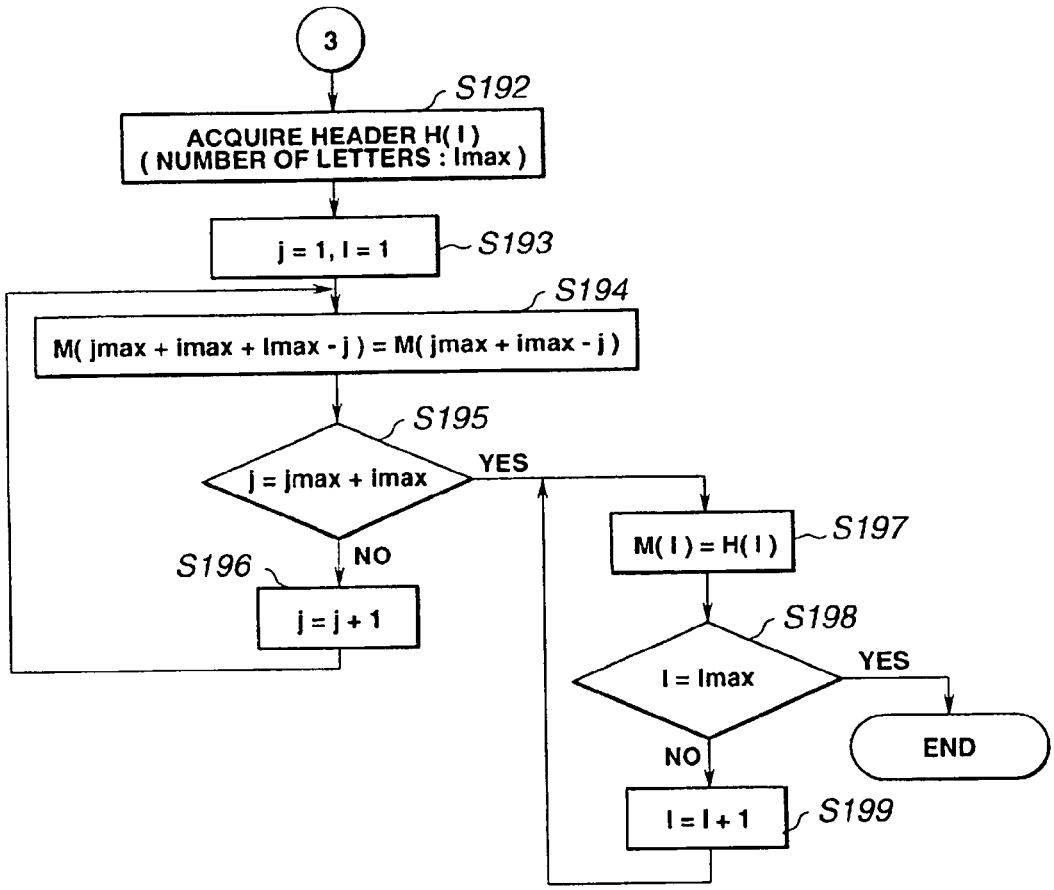
FIG. 22 shows a flowchart of encoding of PSE signals in connection with FIG. 17 in an embodiment of the present invention and specifically showing the manner of appendage of a header.

FIG. 22 is a flowchart for header appendage during PSE encoding shown in FIG. 17.

First, at step S192, the header H(i) is acquired. Since the PSE header is of 2 bytes, lmax=2. Then, at step S193, j=1 and i=1 are set. Then, at step S194, data are shifted backwards by a header so that the (jmax+imax+lmax−1)th letter of M corresponds to (jmax+imax−1)th letter of M. At step S195, it is judged whether nor not j=jmax+imax and, if this condition is not met, j=j+1 is set at step S196. The processing of steps S194, S195 and S196 is repeated. If j−jmax+imax is met at step S195, processing transfers to step S197. Then, at step S197, M(1)=H(1) is set. At step S198, it is judged whether or not i=imax and, at step S199, i=i+1 is set. The processing of the steps S197, S198 and S199 is repeated so that the PSE header is appended at the leading end. If i=imax is met at step S198, the above processing is terminated.

Decoding

FIG. 18 is an example of decoding of PSE which is the reverse operation of encoding of FIG. 17.

The PSE data is received as shown at A in FIG. 18 and the header is first removed, as shown at B in FIG. 18. Then, as shown at C in FIG. 18, the dummy code 'startok' is acquired, as shown at C in FIG. 18, and converted into the 8-bit data of JIS as during encoding at D in FIG. 18. The subtracting processing reversed from that during encoding is performed for restoration to the JIS code shown at F in FIG. 18, before reverting to the JIS code shown at f in FIG. 18.

The leading number '8' is then acquired at G in FIG. 18 for setting the position of insertion of the insertion code. The insertion code is extracted at H in FIG. 18 and the date time code is isolated at I in FIG. 18. The re-arraying for inverting the MSB and LSB sides is performed at J in FIG. 18 for obtaining the distribution date and time of '1996.2.2918:05:38' shown at K in FIG. 18 is obtained.

Decoding Flowchart

Figure 23:
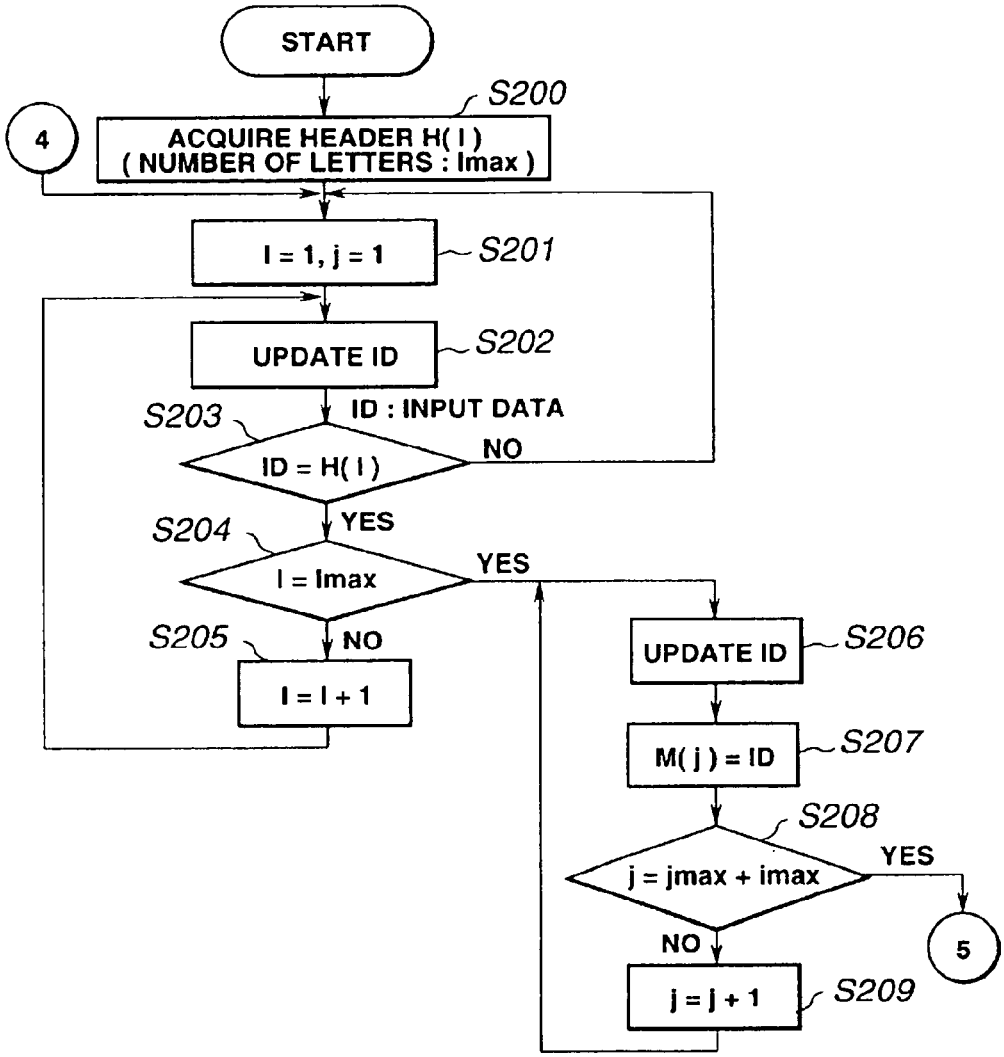
FIG. 23 shows a flowchart of encoding the PSE signals in connection with FIG. 18 in an embodiment of the present invention and specifically showing the flowchart of detection of data and time data.

FIGS. 23 to 26 show the PSE decoding flowchart. FIG. 23 is a flowchart showing the sequence of PSE decoding shown in FIG. 18.

First, at step S200, the header H(1) is acquired. Since the PSE header is of 2 bytes, lmax=2. Then, at step S201, j=1 and i=1 are set. Then, at step S202, it is judged by the PSE check 81 of FIG. 13 whether or not the sequentially entered input data ID is the same as the leading data H(1) of the PSE header '03h, f7h'. If the input data is the same as H(1), processing transfers to step S204. At step S204, it is judged whether or not l=lmax. If this condition is not met, l=l+1 is set at step S205. The processing as from step S202 is repeated for sequentially judging the next data. If the condition is not met at step S203, processing reverts to step S201 to repeat the processing. If the condition of step S204 is met, that is if the data is the same up to the last data H(lmax), the header is judged to have been detected and processing transfers to step S206. After detecting the header, the ID is updated at step S206 and, at step S207, M(j)=ID is set. The next following data string is captured to M(j). Then, at step S208, it is judged whether or not j=jmax+imax. If this condition is not met, j=j+1 is set at step S209 to repeat the processing as from step S206. If the condition at step S208 is met, processing transfers to step S210 of FIG. 24.

Figure 24:
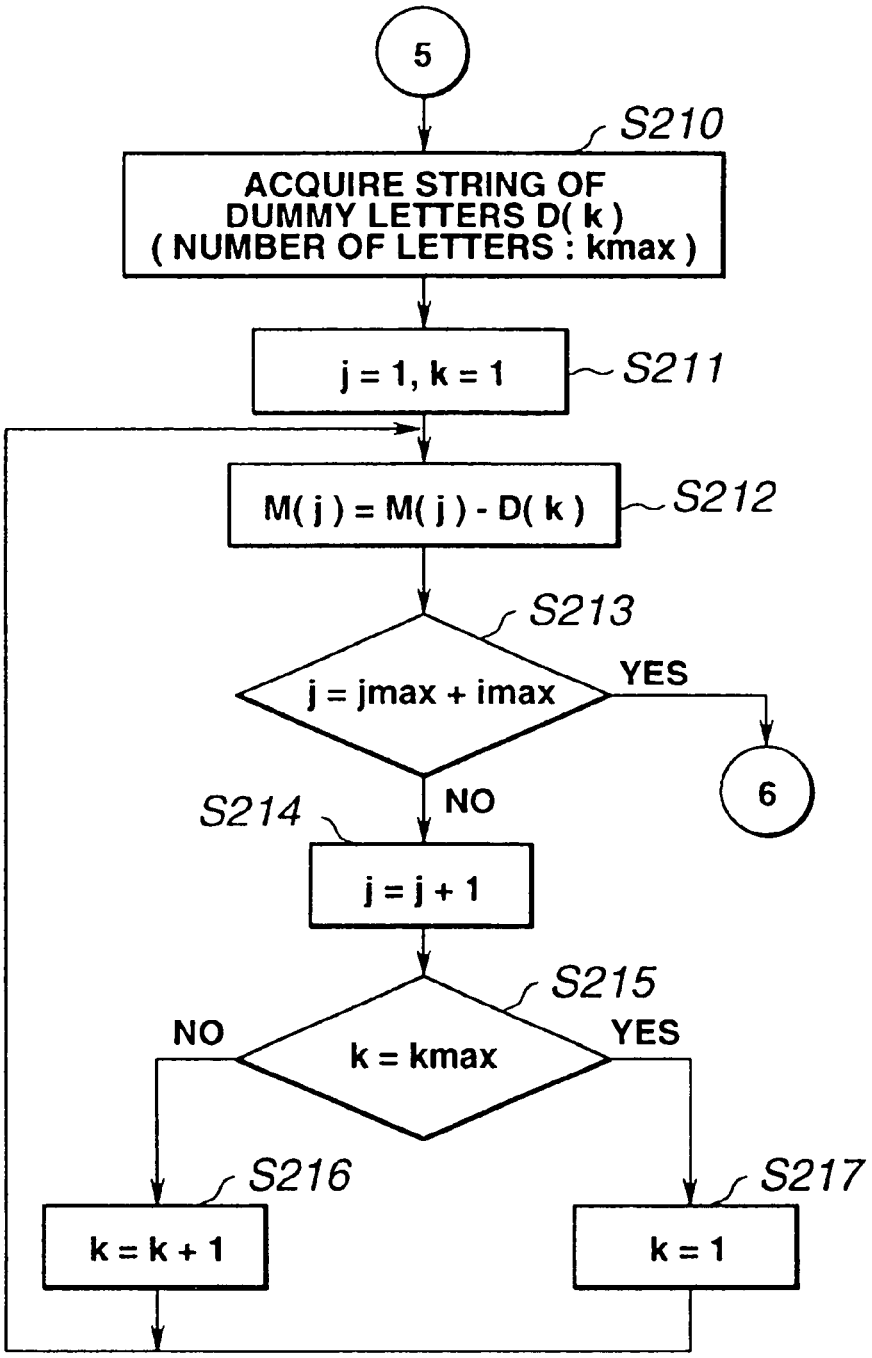
FIG. 24 shows a flowchart showing the decoding of PSE signals in connection with FIG. 18 embodying the present invention and specifically showing subtraction of dummy data.

FIG. 24 is a flowchart up to the subtraction of dummy data at the time of PSE decoding shown in FIG. 18.

First, at step S210, a dummy letter string D(k) is acquired. Since the dummy data is 'startok' in the embodiment of FIG. 4, the number of letters kmax is 7. Then, at step S211, j=1 and k=1 are set. Then, at step S212, M(j)=M(j)−D(k) is set, such that the dummy data is sequentially subtracted from the leading end. At step S213, it is judged whether or not j=jmax+imax. If this condition is not met, j=j+1 is set at step S214. At step S215, it is judged whether or not k=kmax. If this condition is not met, K=K+1 is set at step S216 and the processing as from step S212 is repeated. On the other hand, if the condition of step S215 is met, that is if the dummy data becomes depleted before depletion of the letter string, k=1 is set at step S217 and the processing as from the step S212 is repeated for again summing the dummy data from the leading end.

Figure 25:
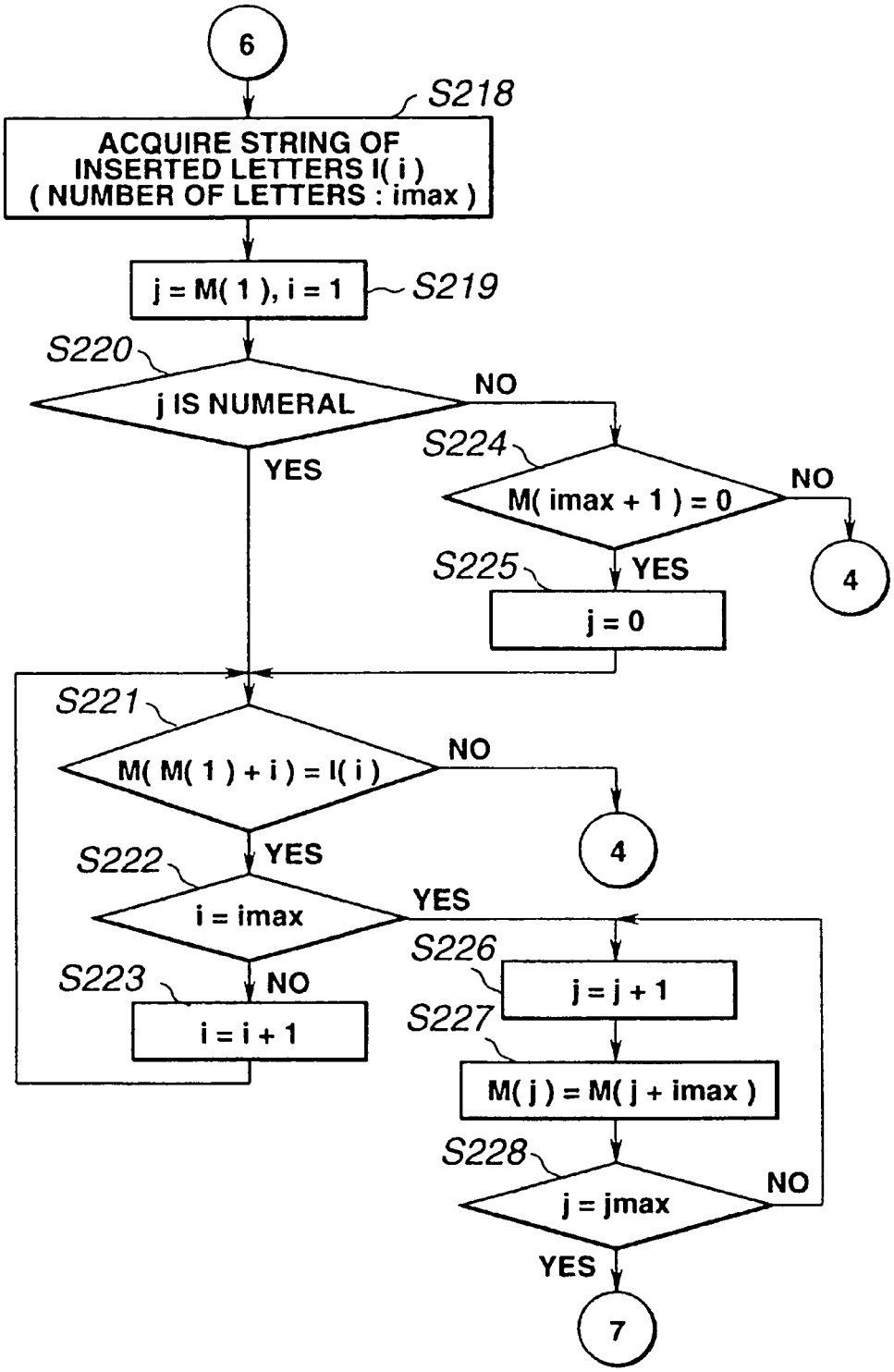
FIG. 25 shows a flowchart showing the decoding of PSE signals in connection with FIG. 18 embodying the present invention and specifically showing extraction of inserted data.
Figure 26:
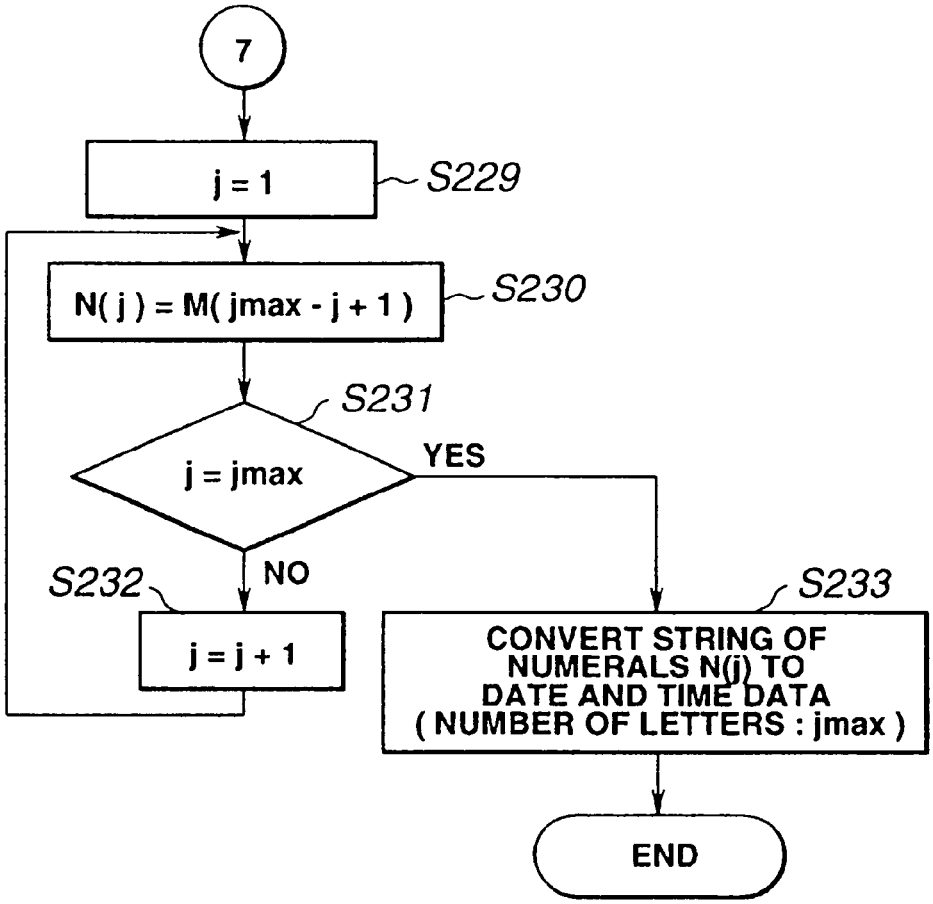
FIG. 26 shows a flowchart showing the decoding of PSE signals in connection with FIG. 18 embodying the present invention and specifically showing re-arraying of data and time data.

FIG. 25 is a flowchart up to extraction of the insertion data at the time of PSE decoding shown in FIG. 18.

First, at step S218, the insertion letter string l(i) is acquired. Since the insertion data is 'ok' in FIG. 17, imax is equal to 2. Then, at step S219, j=M(1) and i=1 are set. M(1) is the leading end letter of the string of letters M(j). At step S220, it is judged whether or not j is the numerical figure. If M(1) is the numerical figure, the figure specifies the position of the insertion code. If M(1) is not a numerical figure, it indicates that dummy data is at the leading end. If the leading end is the numerical figure, processing transfers to step S221 to make judgment whether or not the letter string is the same as the insertion code as from the M(1)+1st letter at which the insertion code is entered. If non-coincident data occurs at step S221 in the course of decision, the data is judged to be not the PSE code such that processing reverts to acquisition of the PSE header of FIG. 23. If all the insertion codes are found to be coincident, data at back of the insertion code is shifted at step S227. Conversely, if the leading end is not the numerical figure, data at back of the insertion code 'ok' once becomes zero. Therefore, it is judged whether or not the data is zero. If the data is not zero, the data is found not to be the PSE code such that processing transfers to acquisition of the PSE header of step S201 of FIG. 23. The subsequent operation is the same as the processing when the leading end is the numerical figure.

First, at step S229, j=1 is set. Then, at step S230, the letter string M(j) is re-arrayed so that the MSB and LSB sides are reversed from each other to give the string of numerical figures N(j). Then, at step S231, it is judged whether j=jmax and, if this condition is not met, j−j+1 is set at step S232 to repeat the processing as from step S230. If the condition of step S231 is met, processing transfers to step S233 to convert the string of numerical figures N(j) into date and time data to terminate the decoding processing.

PSE Signal Processing and CM Data Acquisition Method

The PSE signals, thus acquired, are processed on the receiving side in a different manner depending on whether the broadcast system or the communication system is used, as now explained.

PSE Signal Processing and CM Data Acquisition in Game Machine

Figure 27:
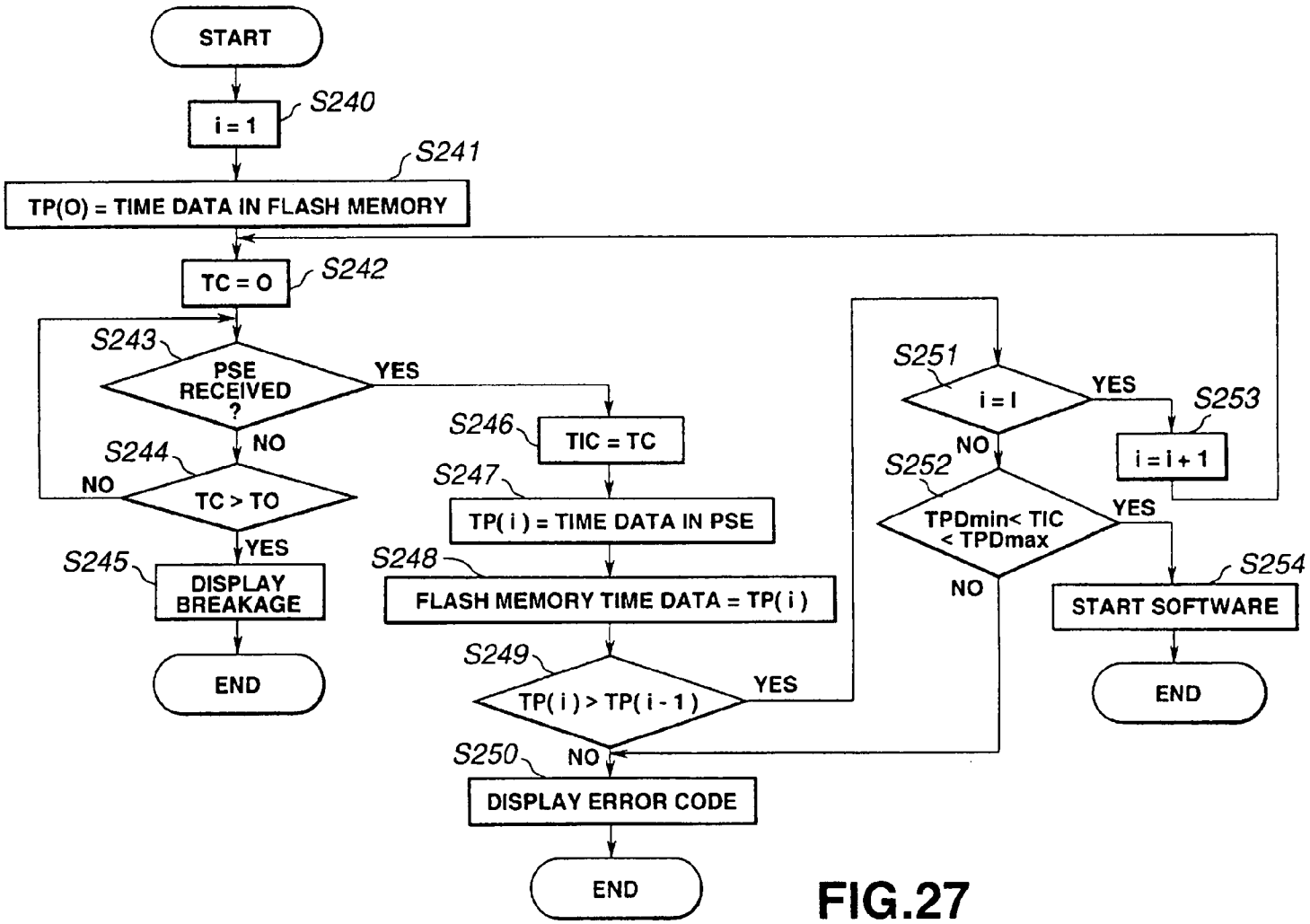
FIG. 27 shows a flowchart showing the processing of PSE signals in a game dedicated machine or a personal computer PC employing a broadcast system embodying the present invention.
Figure 28:
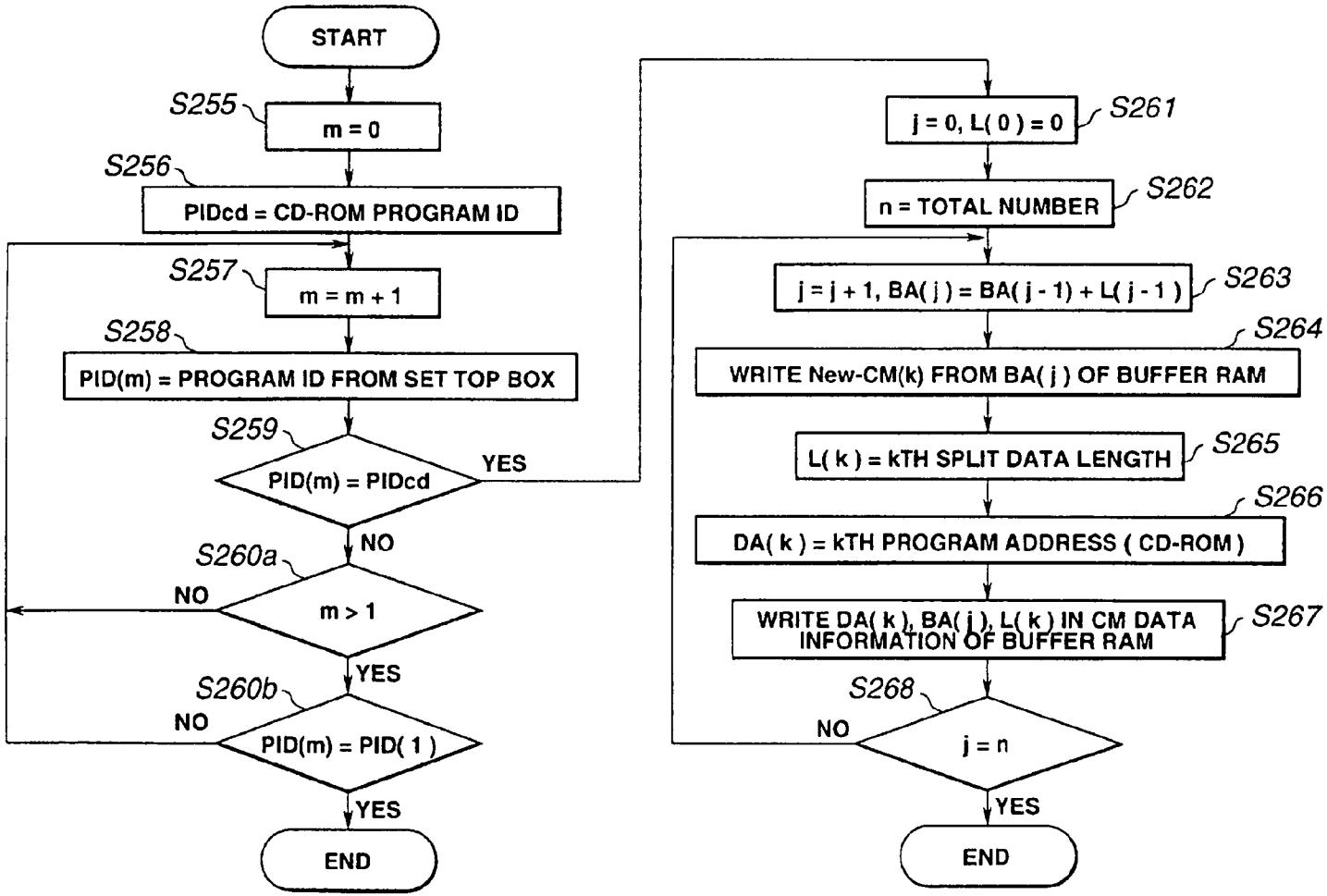
FIG. 28 shows a flowchart showing the processing of CM signals in a game dedicated machine or a personal computer employing a broadcast system embodying the present invention.

FIGS. 27 and 28 are flowcharts showing the method for processing the PSE signals and the acquiring the CM data in the game machine exploiting the broadcast system.

FIG. 27 shows the method of processing the PSE signals. At step S240, i denotes the sequence of acquisition of the PSE signals. At step S240, this i is initialized to 1 (i=1). The flash memory 39 of FIG. 4 holds the time information in the PSE signal received on previous startup. At step S241, the time information thus held is acquired as TP(0). The personal computer (PC) holds the time information in the PSE signal received on previous startup on the HDD 60, so that, in such case, the time information is acquired as TP(0) from the HDD.

If the i'th PSE signal is acquired in the course of progress of the game software, the time information inclusive of the date and time is simply increased. Thus, it is checked if PSE(i)>PSE(i−1) holds and, if the result is NO, the game is interrupted by programming techniques.

The operation of the time counter TC is explained.

This time counter TC perpetually counts the internal clocks. This time counter TC, used for various applications, is herein used for judging whether or not the PSE signal will be received in the limiting time duration TO. TC=0 at step S242 means resetting the counter. At step S242, the counter is reset to wait for reception of the PSE signal at the next step S243. If, however, the PSE signal is not received within a pre-set constant time TO (tine-out), it is judged at step S244 that the broadcast is not being received. Thus, processing transfers to step S245 to display 'non-connection' or 'interruption' to terminate the processing. Meanwhile, TO needs to be longer than the PSE interval 117.

On reception of the PSE signal, the value of TC is first entered to and held in the TIC at step S246. However, this value is irrelevant for the first check since it is used during the second check. Then, at the next step s247, since the time information in the PSE data of the received PSE signal is TP(i), that is i=1, it is held in TP(1). Moreover, the time data in the flash memory 39 is updated at step S248 in the HDD 10 for evading a situation in which erroneous large time data shall be entered to continue error code display in the next stage judgment symbol. At step S248, time data in the flash memory 39 is updated. In case of the personal computer (PC) 68, the time information in the HDD 10 is naturally updated at step S248.

At step S249, the previously acquired time data TP(0) is compared to the current TP(1). As a matter of course, the newly acquired time data must specify the backward time rather than the forward time. If this condition, that is $$TP(i)>TP(i-1)$$

is not met, processing transfers to step S250 to display an error code specifying that the signal is in error before terminating the operation.

If the result of check at step S249 is YES, processing transfers to step S251 to judge whether the PSE signal acquisition is the first occurrence, that is if i=1. If the result of judgement is YES, the value of i is updated at step S253. Then, processing reverts to step S242 to reset the time counter TC for acquiring the second PSE signal at step S243.

If the result of judgment at step S249 is YES, processing transfers to step S251 to judge whether the PSE signal has been acquired for the first time, that is whether or not i=1. If the result is YES, the value of i is updated at step S253. Then, processing reverts to step S242 to reset the time counter TC for acquiring the PSE signal a second time. Then, the time data in the PSE signal received at step S247 is held in TP(2), at the same time as the time data in the flash memory 39 is updated at step S248. At the next step S249, TP(1) is compared to TP(2) as at the first time.

At this step S249, since the time data TP(2) specifies the more backward time than the forward time data TP(1), processing transfers to the next step S251. Since i is not 1, processing transfers to step S252. At this step S252, the value of TCI obtained on counting the clocks in the game machine is compared to the difference between the received TP(1) and TP(2). Since the PSE is sequentially transmitted at the pre-set PSE interval, as explained with reference to FIG. 14, the difference between two consecutive values, such as TP(1) and TP(2), must indicate a value corresponding to the above PSE interval. Thus, if the allowable error value, inclusive of the PSE interval difference, is within ±δT, the two PSE signals are judged to be correct signals. Thus, the software is started to terminate the operation. That is, if the allowable time difference as the allowable error is δT and $$TPDmin=TP(i)-TP(i-1)-\delta T$$

and $$TPDmax=TP(i)-TP(i-1)+\delta T$$

it is judged at step S252 whether or not $TPDmin=TP(i)-TP(i-1)-\delta T<TPDmax=TP(i)-TP(i-1)+\delta T$ holds. If the allowable value is exceeded, processing transfers to step S250 to display an 'error code' specifying that the signal is in error to terminate the operation.

FIG. 28 shows the method for acquiring the CM data when employing the broadcast system. In this figure, m denotes the sequence of acquisition of the program ID signal. At the first step S255, m=0 is set. At the next step S256, the program ID signal on the CD-ROM is held as the PIDcd. At step S257, m is updated each time the program ID signal is acquired. Then, at the next step S258, the program ID signal of the CM data is entered from the set top box to the PID(m). Then, at step S259, the received program ID signal PID(m) is sequentially compared to the PIDcd of the program ID signal on the CD-ROM and, incase of coincidence, processing proceeds to acquisition of the CM data downstream of step S261.

Since the same CM data is repeatedly broadcast, as explained with reference to FIG. 14, if the first m=1 at step S260a, processing reverts to step S257 and, if otherwise, that is if m>1, processing transfers to step S260b. At step S260b, processing reverts to step S257 until the first received program ID signal PID(1) is received, and, if the first received program ID signal PID(1) is received, that is if PID(m)=PID(1), the operation is terminated as indicating that the CM data has made its round.

During reception of CM data as from step S261, j denotes the number of the divided data written in the buffer RAM 31 of FIG. 4 and BA(j) denotes the address at which the CM data has been written in the buffer RAM 31 of FIG. 4. If reference is also had to FIG. 15, the number of total divisions or the total item number n, specifying to which number of data sites corresponds the CM data is specified by the total item number 127, whilst the division number or the division sequence k specifying the serial number of the divided data portions is specified by the divided data lengths 130, 135. The disc address DA(k) specifying the address of the main program on the CD-ROM is specified by the disc addresses 132, 137.

At step S261, j=0 and L(0)=0 are set, whereas, at step S262, n=total item number or the total number of divisions.

The buffer RAM 31, in which the CM data is written, is divided into a CM data area for writing the CM data and the CM data information adapted for holding the information of the CM data held on the buffer RAM 31. At step S263, j=j+1 is set, by way of updating. BA(j) is the current buffer address as found from the buffer address BA(j−1) of the previous CM data and the divided data length L(j−1). At step S264, the acquired new CM data New-CM(k) is sequentially written in the CM data area of the buffer RAM 31, while the divided data length L(k) representing the length of the divided data is updated to the CM data information of the buffer RAM 31, and the disc address DA(k), which is the CD program address specifying the address of the main program on the CD-ROM acquired at step S265, is updated. At step S267, these data and the written address BA(k) of the buffer RAM 31 are written.

At step S268, if the number of the divided written data j is coincident with the number of divisions n specifying to which number of data sites corresponds the CM data, it is judged that all CM data can be written, before terminating the processing.

PSE Signal Processing in the Communication System and Acquisition of CM Data

Figure 29:
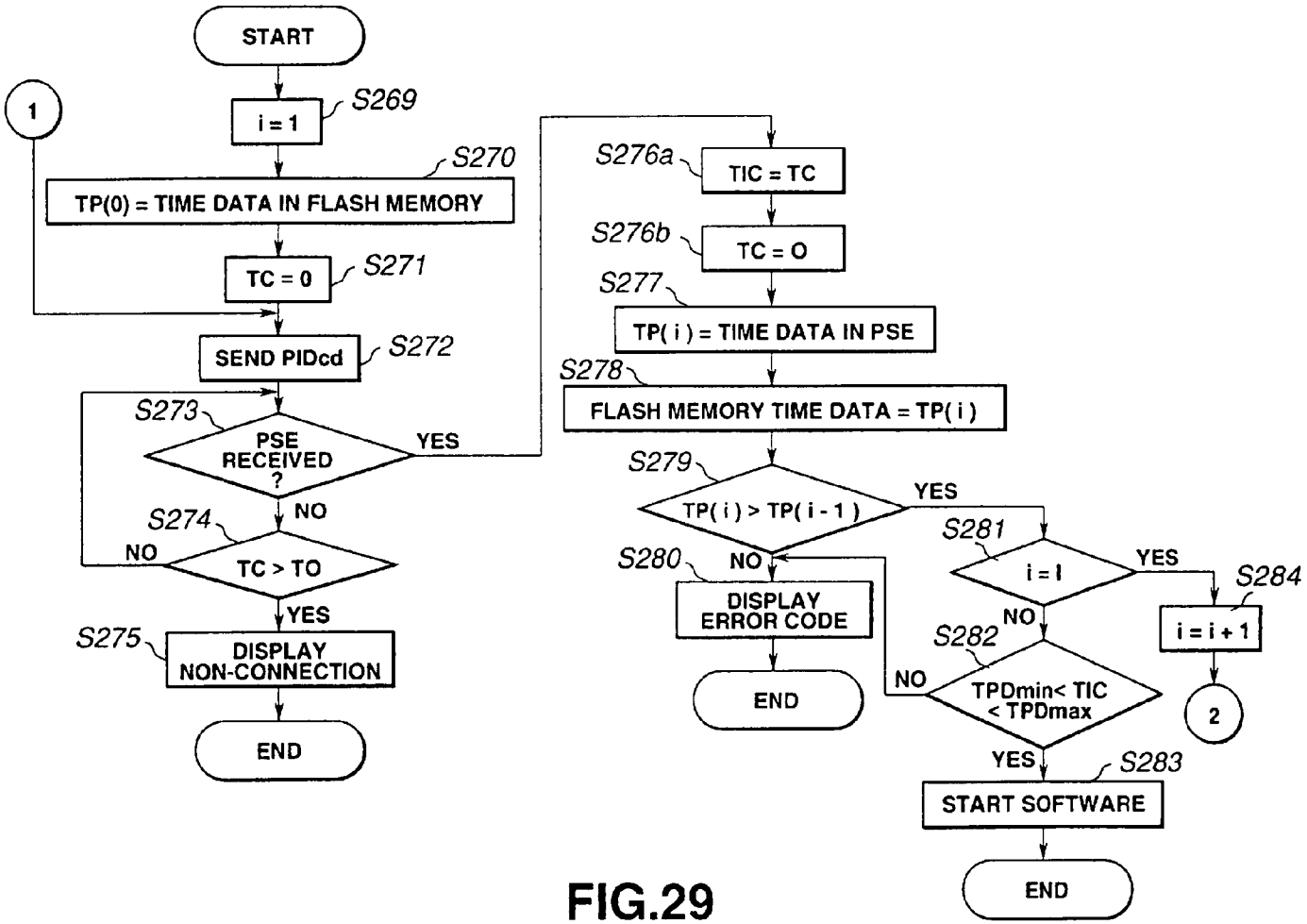
FIG. 29 shows a flowchart showing the processing of PSE signals in a game dedicated machine or a personal computer PC employing a broadcast system embodying the present invention.
Figure 30:
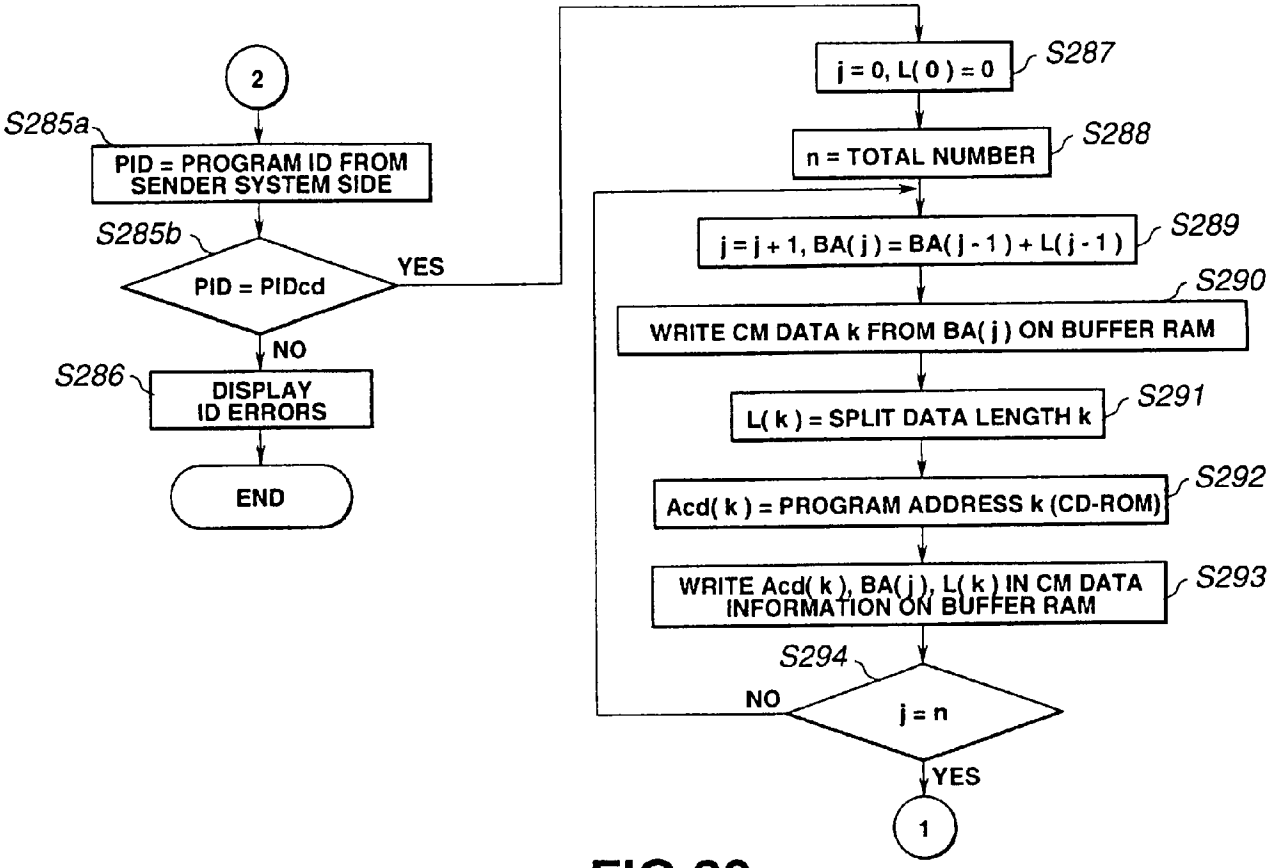
FIG. 30 shows a flowchart showing the acquisition of CM data in a game dedicated machine or a personal computer PC employing a broadcast system embodying the present invention.

FIGS. 29 and 30 show the method for processing the PSE signal in case of utilization of the communication system and the method for acquiring the CM data. In particular, FIGS. 29 and 30 show the PSE signal processing method and the CM data acquiring method, respectively. If the communication system is used, the program ID read by the receiving side system from the CD-ROM 40 is sent via the telephone network 49 to the transmission side system and subsequently the PSE signal is supplied from the transmitting side system to the receiving side system.

In FIG. 29, similarly to FIG. 27, i is initialized io 1 at step S269, where i denotes the sequence in which the PSE signal has been acquired. In the flash memory 39 of FIG. 4, the time information in the previously PSE signal is held. At step S270, the time information thus held is acquired as TP(0). Similarly, since the personal computer 68 shown in FIG. 6 holds in the HDD 60 the time information in the previously received PSE signal, the time information is received as TP(0) from the HDD.

Then, at step S271, the time counter TC is reset (TC=0) and, at step S272, PIDcd of the program ID signal on the CD-ROM is transmitted (arrow a in FIG. 16) to wait for reception of the PSE signal at step S273. At step S274, if the PSE signal is not received within a pre-set time TO (time-out), the broadcast is deemed as being not received, so that, at step S275, 'non-connection' is displayed to terminate the processing.

On reception of the PSE signal (arrow b in FIG. 16), processing proceeds to acquisition of CM data (arrows c and d in FIG. 16). First, at step S276a, the value of TC is entered to TIC. This is irrelevant to the first trial since the value is used for the second check. At step S276b, the time counter TC is again reset to zero (TC=0). This is because the CM data is acquired first in case of communication thus leaving vacant time until acquisition of the PSE signal. Then, at step S277, time data in the received PSE signal is held in TP(1), at the same time as time data in the flash memory 39 is updated. As a matter of course, in the case of the personal computer 68, the time information in the HDD 10 is updated at step S278.

At the next step S279, the previously acquired time data TP(0) is compared to the current TP(1). As a matter of course, the newly acquired time data must indicate the backward time with respect to the previous value. If this condition is not met, an 'error code' indicating that the signal is in error is displayed at step S280 to terminate the operation. If the decision is met, processing proceeds to acquisition of the CM data (arrows c and d in FIG. 16).

In FIG. 30, the program ID from the PID=transmission system is set at the first step S285a. At the next step S285b, the received program ID signal PID is compared to the program ID signal PIDcd on the CD-ROM. It the two signals coincide with each other, processing proceeds to acquisition of the CM data as from step S287. In case of non-coincidence, processing transfers to step S286 to display 'ID error' specifying non-coincidence of the program ID signals to terminate the processing.

The steps S287 to S294 of the CM data acquisition portion since comparison of the PID and PIDcd of the program ID signal at step S285b as to signal coincidence and the affirmative decision are the same as the steps S261 to S268 of FIG. 28 and hence the description is omitted for simplicity. That is, if the allowed time difference, which is the allowed error value, is δT, and $$TPDmin=TP(i)-TP(i-1)-\delta T$$

and $$TPDmax=TP(i)-TP(i-1)+\delta T$$

it is judged at step S282 whether or not $$TPDmin=TP(i)-TP(i-1)-\delta T<TPDmax=fTP(i)-TP(i-1)+\delta T$$

holds.

Conversely, should the allowed value be exceeded, processing transfers to step S280 to display an 'error code' specifying that the signal is in error to terminate the operation. Meanwhile, since the time deviation since transmission until reception is larger in case of communication than in case of broadcast, δT needs to be set to a larger value.

With the game machine which has acquire the CM data as described above, the program is allowed to proceed based on the CM data.

In all of the above-described embodiments of the present invention, it is checked on startup of the software whether or not commercial ads are received and, if the commercial ads are not received, the software start can be halted to inhibit illegal use. Moreover, operation start with an illegal signal can be excluded on software startup.

That is, a game machine can be provided by connecting the household game machines via a communication network or the like to a host computer. Moreover, the game machine and the game playing method employing the system can be provided in which commercial ads can be built into the game software utilized in the game machine system responsive to the needs of advertising firms.

Also, the game machine and the game playing method employing the system can be provided in which commercial ads built into the game software utilized in the game machine system can be optimally updated easily.

In addition, a suitable method can be provided in which it can be judged whether commercial ads are built into the game software and in operation and in which, if the commercial ads are built into the game software in this manner, the corresponding operation is inhibited.

Furthermore, a system can be provided in which, if some time has elapsed since first sale of a game software such that the number of users and hence utility of commercial ads is decreased, the game can be started even failing transmission of newly updated commercial ads.

Based on the above-described embodiments of the present invention, the following examples of execution are recited.

Case of Utilizing Broadcast System (1) A broadcast system capable of distributing digital data in which a signal enabling starting of a software repeatedly at an interval (PSE) is sent to a receiver, such as a set top box, and in which a signal for identifying a software identifying a software started on a receiver side (program ID) and data for substitution or insertion (such as CM data) for substitution of part of data used in the software operation are distributed between the repeatedly sent software start enable signal.

(2) A broadcast system capable of distributing digital data in which a signal enabling start of a software, a signal for identifying a software started on the side of a receiver, and data for substitution or insertion of part of data used during the operation of the software are stored in a storage device, such as a hard disc drive, in which a signal enabling starting of a software repeatedly at an interval (PSE) is sent to a receiver, such as a set top box, and in which a signal for identifying a software identifying a software started on a receiver side and data for substitution or insertion of part of data used in the software operation are distributed between the repeatedly sent software start enable signal.

(3) A game machine having a receiver capable of receiving digital data sent by broadcast and a game machine capable of running a software, in which, in starting the software, the software is not started until acceptance of a signal enabling starting of the forwarded software.

(4) A game machine having a receiver capable of receiving digital data sent by broadcast and a game machine capable of running a software, in which, if an identification signal which is the same as the identification signal for a software which has been started and data for substitution or insertion for substitution of part of data of the software are received during software operation, the data is substituted or inserted during running of the software.

(5) A game machine having a receiver capable of receiving digital data sent by broadcast and a game machine capable of running a software, in which, if an identification signal for a software which has been started is not received during software operation, the operation of the game machine is continued on the initial software.

(6) A game machine having a receiver capable of receiving digital data sent by broadcast and a game machine capable of running a software, in which, in starting the software, the software is not started until acceptance of a signal enabling starting of the forwarded software, and in which, if an identification signal which is the same as the identification signal for a started software and data for substitution or insertion of part of data of the software are received during the software operation, the data is substituted or inserted during running of the software and, if the identification signal for the software is not received, the operation is continued on the initial software.

(7) A broadcast system pertinent to (1) above in which the data for substitution or insertion of part of data of the software are commercial advertisement.

(8) A broadcast system pertinent to (2) above in which the data for substitution or insertion of part of data of the software are commercial advertisement.

(9) A broadcast system pertinent to (4) or (6) above in which the data for substitution or insertion of part of data of the software are commercial advertisement.

(10) A software pertinent to (4), (5), (6) or (9) in which there is inserted an identification signal for the software.

(11) An optical disc pertinent to (10) having also recorded the software.

(12) A broadcast system pertinent to (1) or (7) in which the signal enabling starting of the software is updated.

(13) A broadcast system pertinent to (2) or (8) in which the signal enabling starting of the software is updated.

(14) A game machine pertinent to (3), (6) or (9) in which, if the signal enabling starting of the software is not updated, the software is not started.

(15) A broadcast system pertinent to (12) in which the time information is used as a signal enabling starting of a software for updating.

(16) A broadcast system pertinent to (13) in which the time information is used as a signal enabling starting of a software for updating.

(17) A broadcast system pertinent to (14) in which the time information is used as a signal enabling starting of a software for updating and in which, if the time information shows an unusual value, the software is not updated or the operation is discontinued.

(18) A game machine pertinent to (17) in which, if the time information in a signal enabling starting of the software is smaller than the previously received value, the software is not updated or the operation is discontinued.

(19) A game machine pertinent to (17) in which, if the software enable signal are received at least twice on startup, and the difference between the previously received time information and the tie information received next differs from an integrated clock value, as found by integrating the clocks in the receiving system, since the previous reception ands the next reception, the software is not started.

(20) A game machine pertinent to (17) in which, if the software enable signal are received at least twice during operation of the software, and the difference between the previously received time information and the time information received next differs from an integrated clock value, as found by integrating the clocks in the receiving system, since the previous reception and the next reception, the operation is discontinued.

Case of Utilizing Communication System (1) A communication system capable of receiving/sending digital data in which, if a signal enabling identifying a software for starting is received from a terminal side, a signal enabling starting a software is sent to the terminal, whilst data for substitution or insertion of part of data used in the operation of the software is distributed.

(2) A communication system capable of receiving/sending digital data in which a signal enabling starting of a software and a signal enabling identification of a software started on a receiver side and data for substitution or insertion of part of data used in the operation of the software are stored in a storage device such as a hard disc drive and in which if a signal enabling identifying a software for starting is received from a terminal side, a signal enabling starting a software is sent to the terminal, whilst data for substitution or insertion of part of data used in the operation of the software is distributed.

(3) A game machine having a communication function and capable of operating a software in which, on starting a software, a signal capable of identifying a software to be started is transmitted and in which the software is not started until acceptance of a subsequently sent signal enabling identification of a software.

(4) A game machine having a communication function and capable of operating a software in which a signal capable of identifying a software for starting is transmitted and, if subsequently data for substitution or insertion of part of software data is received, part of data is substituted or inserted during running of the software for executing the game.

(5) A game machine having a communication function and capable of operating a software in which a signal capable of identifying a software for starting is transmitted and, if subsequently data for substitution or insertion of part of software data is not received, the game is executed on the initial software.

(6) A game machine having a communication function and capable of operating a software in which, on starting a software, a signal capable of identifying a software to be started is transmitted, in which the software is not started until acceptance of a subsequently sent signal enabling identification of a software, and in which, if subsequently data for substitution or insertion of part of software data is received, the operation is executed on substituting or inserting part of data during running of the software, whereas, if data for substitution or insertion of part of software data is not received, the game is executed on the initial software.

(7) A communication system pertinent to (1) in which data for substitution or insertion of part of software data used during running of the software are commercial ads.

(8) A communication system pertinent to (2) in which data for substitution or insertion of part of software data used during running of the software are commercial ads.

(9) A communication system pertinent to (4) or (6) in which data for substitution or insertion of part of software data used during running of the software are commercial ads.

(10) A software used in (4), (5), (6) or (9) in which there is inserted an identification signal for a software.

(11) An optical disc pertinent to (10) having also recorded the software.

(12) A communication system pertinent to (1) or (7) in which the signal enabling starting of the software is updated.

(13) A communication system pertinent to (2) or (8) in which the signal enabling starting of the software is updated.

(14) A game machine pertinent to (3), (6) or (9) in which, if the signal enabling starting of the software is not updated, the software is not started.

(15) A communication system pertinent to (12) in which the time information is used as a signal enabling starting of a software for updating.

(16) A communication system pertinent to (13) in which the time information is used as a signal enabling starting of a software for updating.

(17) A game machine pertinent to (14) in which the time information is used as a signal enabling starting of a software for updating and in which, if the time information shows an unusual value, the software is not updated or the operation is discontinued.

(18) A game machine pertinent to (17) in which, if the time information in a signal enabling starting of the software is smaller than the previously received value, the software is not updated or the operation is discontinued.

(19) A game machine pertinent to (17) in which, on startup of a software, a signal capable of identifying the software is transmitted and a signal enabling startup of the software is received, in which subsequently a signal capable of identifying the software is again transmitted and a signal enabling startup of the software is received, in which the number of clocks in the game machine since previous reception until next reception is integrated, and in which, if the difference between the previously received time information and the subsequently received time information differs significantly from the integrated clock values, the software is not started.

(20) A game machine pertinent to (17) in which, during running of a software, a signal capable of identifying the software is transmitted and a signal enabling startup of the software is received, in which subsequently a signal capable of identifying the software is again transmitted is and a signal enabling startup of the software is received, in which the number of clocks in the game machine since previous reception until next reception is integrated, and in which, if the difference between the previously received time information and the subsequently received time information differs significantly from the integrated clock values, the software is not started.

What is claimed is:

1. A program start control apparatus for controlling the starting of a software program, comprising:

receiving means for receiving from a data distributing device data for substitution or insertion for original data of part of the software program and encrypted program start enable signal; and limiting means for enabling execution of a program of substituting or inserting said data for original data of part of the software program if the encrypted program start enable signal can be decoded regularly, said limiting means limiting starting of said software program if the encrypted program start enable signal cannot be decoded regularly.

2. A program start limiting method for limiting starting of a software program, comprising:

a receiving step of receiving from a data distributing device data for substitution or insertion for original data of part of the software program and encrypted program start enable signal; and a limiting step of enabling execution of a program of substituting or inserting said data for original data of part of the software program if the encrypted program start enable signal can be decoded regularly and limiting starting of said software program if the encrypted program start enable signal cannot be decoded regularly.

*3. A distributing apparatus for distributing a software program that causes visual information represented by said software program to be displayed, comprising:*

*storing means for storing new data to be displayed that is substituted for, or inserted into, discrete portions of said software program that contains old data that has been previously displayed;*

*generating means for generating an encrypted program start enable (PSE) signal which limits starting of said software program if said encrypted PSE signal cannot be decoded regularly by a data executing device; and*

*distributing means for distributing to said data executing device said new data to be displayed and said encrypted PSE signal which, if decoded regularly by said data executing device, enables execution of a program of substituting or inserting new data, thereby causing the display of said visual information in which said new data is displayed in place of said old data that had been displayed.*

*4. A method of distributing a software program that causes visual information represented by said software program to be displayed, comprising the steps of:*

*storing new data to be displayed that is substituted for, or inserted into, discrete portions of said software program that contains old data that has been previously displayed;*

*generating an encrypted program start enable (PSE) signal which limits starting of said software program if said encrypted PSE signal cannot be decoded regularly by a data executing device; and*

*distributing to said data executing device said new data to be displayed and said encrypted PSE signal which, if decoded regularly by said data executing device, enables execution of a program of substituting or inserting new data, thereby causing the display of said visual information in which said new data is displayed in place of said old data that had been displayed.*

*5. A program start control apparatus for controlling the starting of a software program, comprising:*

*a receiver configured to receive from a data distributing device data for substitution or insertion for original data of part of the software program and encrypted program start enable signal; and*

*a processor programmed to enable substituting or inserting said data for original data of part of the software program if the encrypted program start enable signal can be decoded regularly, said processor limiting starting of said software program if the encrypted program start enable signal cannot be decoded regularly.*

*6. A distributing apparatus for distributing a software program that causes visual information represented by said software program to be displayed, comprising;*

*a memory configured to store new data to be displayed that is substituted for, or inserted into, discrete portions of said software program that contains old data that has been previously displayed;*

*a generator configured to generate an encrypted program start enable (PSE) signal which limits starting of said software program if said encrypted PSE signal cannot be decoded regularly by a data executing device; and*

*a distributor configured to distribute to said data executing device said new data to be displayed and said encrypted PSE signal which, if decoded regularly by said data executing device, enables execution of a program of substituting or inserting new data, thereby causing the display of said visual information in which said new data is displayed in place of said old data that had been displayed.*

* * * * *